United States Patent
Hongo et al.

(10) Patent No.: US 12,209,191 B2
(45) Date of Patent: Jan. 28, 2025

(54) INK COMPOSITION FOR PERFORMING PRINTING ON IMPERMEABLE BASE MATERIAL AND IMAGE RECORDING METHOD

(71) Applicant: FUJIFILM Corporation, Tokyo (JP)

(72) Inventors: Yushi Hongo, Kanagawa (JP); Ryuji Shinohara, Kanagawa (JP); Hiroshi Yamamoto, Kanagawa (JP); Masaharu Kawai, Kanagawa (JP); Taiga Mizoe, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 865 days.

(21) Appl. No.: 17/131,768

(22) Filed: Dec. 23, 2020

(65) Prior Publication Data

US 2021/0108097 A1    Apr. 15, 2021

Related U.S. Application Data

(63) Continuation of application No. PCT/JP2019/030755, filed on Aug. 5, 2019.

(30) Foreign Application Priority Data

Sep. 7, 2018   (JP) .................. 2018-167651

(51) Int. Cl.
*C09D 11/107* (2014.01)
*B41M 5/00* (2006.01)
*C09D 11/104* (2014.01)
*C09D 11/322* (2014.01)

(52) U.S. Cl.
CPC ......... *C09D 11/107* (2013.01); *B41M 5/0023* (2013.01); *C09D 11/104* (2013.01); *C09D 11/322* (2013.01)

(58) Field of Classification Search
CPC ... C09D 11/107; C09D 11/104; C09D 11/322; B41M 5/0023
See application file for complete search history.

(56) References Cited

U.S. PATENT DOCUMENTS

| | | |
|---|---|---|
| 6,378,999 B1 | 4/2002 | Doi et al. |
| 2007/0146454 A1 | 6/2007 | Doi et al. |
| 2007/0222811 A1 | 9/2007 | Yanagi |
| 2012/0262517 A1 | 10/2012 | Takaku et al. |
| 2016/0177116 A1* | 6/2016 | Katsuragi ............ B41J 2/2107 347/102 |
| 2018/0030300 A1 | 2/2018 | Ohta |
| 2019/0126657 A1 | 5/2019 | Kuroda et al. |
| 2019/0217602 A1* | 7/2019 | Kaimoto .................. B41M 5/52 |

FOREIGN PATENT DOCUMENTS

| | | |
|---|---|---|
| EP | 2677008 | 12/2013 |
| JP | 2004035863 | 2/2004 |
| JP | 2007169528 | 7/2007 |
| JP | 2007260984 | 10/2007 |
| JP | 2012224658 | 11/2012 |
| JP | 2014210837 | 11/2014 |
| JP | 2015193788 | 11/2015 |
| JP | 2017186472 | 10/2017 |
| WO | 2016143437 | 9/2016 |
| WO | 2017217540 | 12/2017 |

OTHER PUBLICATIONS

"Search Report of Europe Counterpart Application", issued on Oct. 22, 2021, p. 1-p. 6.
Office Action of Japan Counterpart Application, with English translation thereof, issued on Dec. 7, 2021, pp. 1-5.
"International Search Report (Form PCT/ISA/210) of PCT/JP2019/030755," mailed on Sep. 24, 2019, with English translation thereof, pp. 1-5.
"Written Opinion of the International Searching Authority (Form PCT/ISA/237) of PCT/JP2019/030755," mailed on Sep. 24, 2019, with English translation thereof, pp. 1-10.
"Office Action of China Counterpart Application" with English translation thereof, issued on Mar. 3, 2022, p. 1-p. 17.
"Office Action of Europe Counterpart Application", issued on Nov. 5, 2024, pp. 1-4.

* cited by examiner

*Primary Examiner* — John E Uselding
(74) *Attorney, Agent, or Firm* — JCIPRNET

(57) ABSTRACT

An ink composition for performing printing on an impermeable base material, including water (A), a resin (B) which is at least one selected from the group consisting of an acrylic resin, a polyester resin, and a urethane resin, and an organic solvent (C) which has a boiling point of 250° C. or lower, has no nitrogen atom, and satisfies Expression (C1), in which a total content of the organic solvent (C) is in a range of 0.01% by mass to 5.0% by mass with respect to a total amount of the ink composition. In Expression (C1), $SP_B$ represents an SP value of a main resin in the resin (B) in an $MPa^{1/2}$ unit, $SP_C$ represents an SP value of the organic solvent (C) in the $MPa^{1/2}$ unit, and $|SP_C-SP_B|$ represents an absolute value of a difference between $SP_C$ and $SP_B$:

$|SP_C-SP_B| \leq 10.0$    Expression (C1).

19 Claims, No Drawings

INK COMPOSITION FOR PERFORMING PRINTING ON IMPERMEABLE BASE MATERIAL AND IMAGE RECORDING METHOD

CROSS-REFERENCE TO RELATED APPLICATIONS

This application is a Continuation of PCT International Application No. PCT/JP2019/030755 filed on Aug. 5, 2019, which claims priority under 35 U.S.C § 119(a) to Japanese Patent Application No. 2018-167651 filed on Sep. 7, 2018. Each of the above application(s) is hereby expressly incorporated by reference, in its entirety, into the present application.

BACKGROUND OF THE INVENTION

1. Field of the Invention

The present disclosure relates to an ink composition for performing printing on an impermeable base material and an image recording method.

2. Description of the Related Art

In the related art, various examinations have been conducted on inks used for recording images.

For example, JP2014-210837A discloses, as an inkjet aqueous white ink containing titanium oxide as a pigment and having low viscosity, excellent storage stability, and an excellent pigment settling property, an inkjet aqueous white ink containing titanium oxide, a pigment dispersion resin, an organic solvent, and water, for which a resin obtained by copolymerizing at least α-olefin and (anhydrous) maleic acid is used as a pigment dispersion resin.

Further, JP2017-186472A discloses, as an aqueous inkjet ink composition which has excellent clogging resistance in a head and is capable of forming an image having excellent rub resistance, an aqueous inkjet ink composition containing a resin, a nitrogen-containing solvent in which a difference in SP value between the resin and the solvent is 3 or less, and water, in which the content of the nitrogen-containing solvent is in a range of 2 to 9 parts by mass with respect to 1 part by mass of the resin, and the content of the organic solvent having a standard boiling point of 280° C. or higher is 3% by mass or less.

SUMMARY OF THE INVENTION

Meanwhile, in a case where an image is recorded on a base material using an ink composition, rub resistance and adhesiveness (specifically, the adhesiveness to the base material, the same applies hereinafter) to the recorded image is required in some cases. As a method for satisfying such a requirement, a method of allowing the ink composition to contain a resin so that the film-forming property of the ink composition in a case of drying of the ink composition on the base material is improved, and thus the adhesiveness and the rub resistance of the image to be obtained are improved is exemplified.

However, in a case where an impermeable base material such as a resin base material is used as the base material, from the viewpoint of suppressing deformation or the like of the impermeable base material, it is desirable that the drying conditions of the ink composition on the impermeable base material are not extremely strong (for example, the drying temperature is not set to be extremely high). In consideration of the above-described circumstances, in a case where an impermeable base material is used as the base material, it is desirable that the adhesiveness and the rub resistance of the image are improved not by strengthening the drying conditions but by applying the performance of the ink composition.

Further, in a case where the drying conditions of the ink composition on the impermeable base material are weakened (for example, in a case where the drying temperature is lowered), the drying property of the image is insufficient and, accordingly, the image is sticky in some cases. In consideration of the above-described circumstances, in the case where an impermeable base material is used as the base material, the drying property of the image is also required to be improved by applying the performance of the ink composition.

For the above-described reasons, there is a demand for an ink composition for performing printing on an impermeable base material, which is capable of recording an image with excellent adhesiveness, excellent rub resistance, and an excellent drying property, on the impermeable base material.

In regard to the above-described points, in a case where the ink composition described in JP2014-210837A (that is, the inkjet aqueous white ink) and the ink composition described in JP2017-186472A (that is, the aqueous inkjet ink composition) are used, the drying property of the image tends to be insufficient.

The present disclosure has been made in consideration of the above-described circumstances.

An object of one aspect of the present disclosure is to provide an ink composition for performing printing on an impermeable base material and an image recording method, which enable recording of an image with excellent adhesiveness, excellent rub resistance, and an excellent drying property on an impermeable base material.

Specific means for achieving the above-described objects includes the following aspects.

<1> An ink composition for performing printing on an impermeable base material, comprising: water (A); a resin (B) which is at least one selected from the group consisting of an acrylic resin, a polyester resin, and a urethane resin; and an organic solvent (C) which has a boiling point of 250° C. or lower, has no nitrogen atom, and satisfies Expression (C1), in which a total content of the organic solvent (C) is in a range of 0.01% by mass to 5.0% by mass with respect to a total amount of the ink composition for performing printing on an impermeable base material.

$$|SP_C - SP_B| \leq 10.0 \qquad \text{Expression (C1)}$$

In Expression (C1), $SP_B$ represents an SP value of a main resin in the resin (B) in an $MPa^{1/2}$ unit, $SP_C$ represents an SP value of the organic solvent (C) in the $MPa^{1/2}$ unit, and $|SP_C - SP_B|$ represents an absolute value of a difference between $SP_C$ and $SP_B$.

<2> The ink composition for performing printing on an impermeable base material according to <1>, in which $SP_C$ is in a range of 10.0 to 30.0.

<3> The ink composition for performing printing on an impermeable base material according to <1> or <2>, in which the organic solvent (C) contains at least one selected from the group consisting of a glycol compound, a glycol monoether compound, and a monoalcohol compound having 5 or more carbon atoms.

<4> The ink composition for performing printing on an impermeable base material according to any one of <1> to <3>, in which the organic solvent (C) contains at least one selected from the group consisting of a glycol monoether compound and a monoalcohol compound having 5 or more carbon atoms.

<5> The ink composition for performing printing on an impermeable base material according to any one of <1> to <4>, in which the organic solvent (C) contains at least one selected from the group consisting of diethylene glycol monobutyl ether, diethylene glycol monoethyl ether, dipropylene glycol monomethyl ether, ethylene glycol monobutyl ether, propylene glycol monobutyl ether, ethylene glycol monopropyl ether, propylene glycol monopropyl ether, propylene glycol monoethyl ether, propylene glycol monomethyl ether, tripropylene glycol monomethyl ether, and 2-ethyl-1-hexanol.

<6> The ink composition for performing printing on an impermeable base material according to any one of <1> to <5>, in which $|SP_C-SP_B|$ is 5.0 or less.

<7> The ink composition for performing printing on an impermeable base material according to any one of <1> to <6>, further comprising: a water-soluble organic solvent (D) which has a boiling point of 250° C. or lower and satisfies Expression (D1).

$$|SP_D-SP_B|>10.0 \quad \text{Expression (D1)}$$

In Expression (D1), $SP_B$ represents an SP value of a main resin in the resin (B) in an $MPa^{1/2}$ unit, $SP_D$ represents an SP value of the water-soluble organic solvent (D) in the $MPa^{1/2}$ unit, and $|SP_D-SP_B|$ represents an absolute value of a difference between $SP_D$ and $SP_B$.

<8> The ink composition for performing printing on an impermeable base material according to <7>, in which a total content of the water-soluble organic solvent (D) is in a range of 20% by mass to 40% by mass with respect to the total amount of the ink composition for performing printing on an impermeable base material.

<9> The ink composition for performing printing on an impermeable base material according to <7> or <8>, in which the water-soluble organic solvent (D) contains at least one selected from the group consisting of a glycol compound.

<10> The ink composition for performing printing on an impermeable base material according to any one of <1> to <9>, in which the resin (B) contains resin particles.

<11> The ink composition for performing printing on an impermeable base material according to any one of <1> to <10>, further comprising: a colorant.

<12> The ink composition for performing printing on an impermeable base material according to any one of <1> to <11>, in which the ink composition is used as an inkjet ink.

<13> An image recording method comprising: a step of applying the ink composition for performing printing on an impermeable base material according to any one of <1> to <12> onto an impermeable base material to record an image.

<14> An image recording method comprising: a step of applying an ink composition onto an impermeable base material to record an image, in which the ink composition contains water (A); a resin (B) which is at least one selected from the group consisting of an acrylic resin, a polyester resin, and a urethane resin; and an organic solvent (C) which has a boiling point of 250° C. or lower, has no nitrogen atom, and satisfies Expression (C1), and a total content of the organic solvent (C) is in a range of 0.01% by mass to 5.0% by mass with respect to a total amount of the ink composition.

$$|SP_C-SP_B|\leq10.0 \quad \text{Expression (C1)}$$

In Expression (C1), $SP_B$ represents an SP value of a main resin in the resin (B) in an $MPa^{1/2}$ unit, $SP_C$ represents an SP value of the organic solvent (C) in the $MPa^{1/2}$ unit, and $|SP_C-SP_B|$ represents an absolute value of a difference between $SP_C$ and $SP_B$.

According to one aspect of the present disclosure, it is possible to provide an ink composition for performing printing on an impermeable base material and an image recording method, which enable recording of an image with excellent adhesiveness, excellent rub resistance, and an excellent drying property on an impermeable base material.

DESCRIPTION OF THE PREFERRED EMBODIMENTS

In the present disclosure, a numerical range shown using "to" indicates a range including the numerical values described before and after "to" as a lower limit and an upper limit.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or a value described in an example.

In the present disclosure, the meaning of the term "step" includes not only an independent step but also a step whose intended purpose is achieved even in a case where the step is not clearly distinguished from other steps.

In the present disclosure, a combination of two or more preferred embodiments is a more preferred embodiment.

[Ink Composition for Performing Printing on Impermeable Base Material]

An ink composition for performing printing on an impermeable base material (hereinafter, also simply referred to as an "ink") according to the embodiment of the present disclosure is used for recording an image on an impermeable base material and contains water (A), a resin (B) which is at least one selected from the group consisting of an acrylic resin, a polyester resin, and a urethane resin, and an organic solvent (C) which has a boiling point of 250° C. or lower, has no nitrogen atom, and satisfies Expression (C1), and the total content of the organic solvent (C) is in a range of 0.01% by mass to 5.0% by mass with respect to the total amount of the ink.

$$|SP_C-SP_B|\leq10.0 \quad \text{Expression (C1)}$$

In Expression (C1), $SP_B$ represents an SP value of a main resin in the resin (B) in an $MPa^{1/2}$ unit, $SP_C$ represents an SP value of the organic solvent (C) in the $MPa^{1/2}$ unit, and $|SP_C-SP_B|$ represents an absolute value of a difference between $SP_C$ and $SP_B$.

In the present disclosure, the term "SP value" simply indicates the SP value in an $MPa^{1/2}$ unit.

The SP value in the present disclosure is a value calculated by the Okitsu method ("Journal of the Adhesion Society of Japan", written by Toshinao Okitsu, 29(5) (1993)).

Specifically, the SP value is calculated by the following equation. Further, $\Delta F$ is a value described in the literatures.

$$\text{SP value } (\delta)=\Sigma\Delta F(\text{Molar Attraction Constants})/V \text{ (molar volume)}$$

Further, in the present disclosure, the "main resin in the resin (B)" indicates a resin having the largest content mass with respect to the entire ink among all the resins contained in the ink.

The number of kind of the main resins in the resin (B) is not limited to one and may be two or more. For example, in a case where the resin (B) is formed of a resin X, a resin Y, and a resin Z, the content mass of the resin X is the same as the content mass of the resin Y, and the content mass of the resin X and the content mass of the resin Y are respectively greater than the content mass of the resin Z, the main resins in the resin (B) are two kinds of resins, which are the resin X and the resin Y. In a case where two or more main resins are present in the resin (B), the organic solvent (C) is a water-soluble organic solvent which satisfies Expression (C1) with respect to all the main resins, has a boiling point of 250° C. or lower, and has no nitrogen atom.

$SP_B$ of the main resin is acquired by weight-averaging the SP values of the respective constitutional units constituting the main resin according to the content mass thereof in the main resin.

More specifically, the SP value of the main resin (that is, $SP_B$) is a value acquired as X by substituting the SP value of an i-type (i represents an integer of 1 or greater) constitutional unit in the main resin for $S_i$ and substituting the content mass of the i-type constitutional unit in the main resin for $W_i$ in Mathematical Formula 1.

[Mathmatical Formula 1]

$$X = \frac{\sum S_i W_i}{\sum W_i} \quad \text{(Mathmatical Formula 1)}$$

As the SP value of the constitutional unit, the SP value of the compound for forming the constitutional unit is employed.

For example, the SP value of a resin a formed of a compound A (10% by mass) having an SP value of 15 $MPa^{1/2}$, a compound B (20% by mass) having an SP value of 18 $MPa^{1/2}$, and a compound C (70% by mass) having an SP value of 20 $MPa^{1/2}$ as raw materials is acquired by the following equation.

SP value ($MPa^{1/2}$) of resin $a=(15\ MPa^{1/2}\times10+18\ MPa^{1/2}\times20+20\ MPa^{1/2}\times70)/(10+20+70)=19.1\ MPa^{1/2}$ The constitutional units in the main resin are identified by thermal analysis gas chromatography.

The analysis of the content mass of the constitutional units in the main resin is performed by nuclear magnetic resonance (NMR).

According to the ink according to the embodiment of the present disclosure, an image with excellent adhesiveness (that is, adhesiveness to the impermeable base material), excellent rub resistance, and an excellent drying property can be recorded on the impermeable base material.

The reason why such an effect is exhibited is assumed as follows. However, the ink according to the embodiment of the present disclosure is not limited to the following reason.

In the ink according to the embodiment of the present disclosure, it is considered that since the absolute value (that is, $|SP_C-SP_B|$) of the difference between the SP value of the main resin in the resin (B) (that is, $SP_B$) and the SP value of the organic solvent (C) (that is, $SP_C$) is 10.0 or less, and the total content of the organic solvent (C) is in a range of 0.01% by mass to 5.0% by mass with respect to the total amount of the ink, the film-forming property of the resin (B) in the ink applied onto the impermeable base material is enhanced and thus a strong film (that is, an image with excellent adhesiveness and rub resistance) is formed.

Further, it is considered that since the boiling point of the organic solvent (C) is 250° C. or lower, the organic solvent (C) does not have a nitrogen atom, the total content of the organic solvent (C) is in a range of 0.01% by mass to 5.0% by mass with respect to the total amount of the ink, and the resin (B) is at least one selected from the group consisting of an acrylic resin, a polyester resin, and a urethane resin, the drying property of the ink (that is, the image) applied onto the impermeable base material is improved.

In the present disclosure, the drying property of an image indicates a property of rapidly removing the water and/or water-soluble organic solvent from the image in a case of drying the image.

In a case where the drying property of the image is insufficient, the image may be sticky due to the remaining water and/or water-soluble organic solvent.

In a case where the ink composition described in JP2014-210837A is used as the ink according to the embodiment of the present disclosure, the drying property of the image tends to be insufficient. The reason for this is not clear, but it is considered that the pigment dispersion resin in the ink composition described in JP2014-210837A has a property of taking in water and/or a water-soluble organic solvent so as to be easily gelled, and this property works against the drying property of the image.

In the ink according to the embodiment of the present disclosure, since the resin (B) is at least one selected from the group consisting of an acrylic resin, a polyester resin, and a urethane resin, the insufficiency of the drying property of the image is resolved as compared with the case where the ink composition described in JP2014-210837A is used.

Further, in a case where the ink composition described in JP2017-186472A is used as the ink according to the embodiment of the present disclosure, the drying property of the image tends to be insufficient. The reason for this is not clear, but it is considered that the nitrogen-containing solvent in the ink composition described in JP2017-186472A acts to increase the hygroscopicity of the image.

In the ink according to the embodiment of the present disclosure, since the organic solvent (C) does not have a nitrogen atom, the drying property of the image is improved as compared with the case where the ink composition described in JP2017-186472A is used.

Further, since the resin (B) is at least one selected from the group consisting of an acrylic resin, a polyester resin, and a urethane resin, the ink according to the embodiment of the present disclosure also has excellent jettability (hereinafter, also simply referred to as "jettability") from an ink jet nozzle in a case where the ink is used as an inkjet ink as compared with the ink composition described in JP2014-210837A.

In contrast to the ink according to the embodiment of the present disclosure, the ink composition described in JP2017-186472A tends to have degraded jettability. The reason for this is not clear, but it is considered that the pigment dispersion resin in the ink composition described in JP2017-186472A has a property of being easily gelled.

Hereinafter, each component that can be contained in the ink according to the embodiment of the present disclosure will be described.

<Water (A)>

The ink according to the embodiment of the present disclosure contains water (A).

That is, the ink according to the embodiment of the present disclosure is a so-called aqueous ink.

The content of water (A) is preferably 50% by mass or greater and more preferably 60% by mass or greater with respect to the total amount of the ink.

The upper limit of the content of water (A) is appropriately determined according to the content of other components. The upper limit of the content of water (A) may be 90% by mass, 80% by mass, or the like.

<Resin (B)>

The ink of the present disclosure contains the resin (B).

Here, the resin (B) indicates the entire resin component contained in the ink.

The resin (B) is at least one selected from the group consisting of an acrylic resin, a polyester resin, and a urethane resin.

In this manner, the adhesiveness of the image, the rub resistance of the image, and the drying property of the image are improved.

In the present disclosure, the acrylic resin indicates a polymer (a homopolymer or a copolymer) of a raw material monomer containing at least one selected from the group consisting of acrylic acid, a derivative of acrylic acid (such as acrylic acid ester), methacrylic acid, and a derivative of methacrylic acid (such as methacrylic acid ester).

Further, in the present disclosure, the polyester resin indicates a polymer compound having an ester bond in the main chain. Examples of the polyester resin include a polycondensate of polycarboxylic acid (such as dicarboxylic acid) and polyalcohol (such as a diol).

Further, in the present disclosure, the urethane resin indicates a polymer compound having a urethane bond in the main chain.

The weight-average molecular weight (Mw) of the acrylic resin is preferably in a range of 3000 to 100000, more preferably in a range of 5000 to 80000, and still more preferably in a range of 8000 to 60000.

The weight-average molecular weight (Mw) of the polyester resin is preferably in a range of 3000 to 200000, more preferably in a range of 4000 to 150000, still more preferably in a range of 5000 to 100000.

The weight-average molecular weight (Mw) of the urethane resin is preferably in a range of 3000 to 500000, more preferably in a range of 4000 to 300000, and still more preferably in a range of 5000 to 200000.

In the present disclosure, the weight-average molecular weight (Mw) indicates a value measured by gel permeation chromatography (GPC) unless otherwise specified.

The measurement according to gel permeation chromatography (GPC) is performed using HLC (registered trademark)—8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 µl, and a measurement temperature of 40° C. using an RI detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

Specific examples of the resin (B) include resin particles which are particles formed of a resin, and a pigment dispersion resin for covering at least a part of a pigment to disperse the pigment.

From the viewpoint of further improving the adhesiveness and the rub resistance of the image, it is preferable that the resin (B) contains at least one kind of resin particles.

In a case where the resin (B) contains resin particles, the resin (B) may further contain at least one pigment dispersion resin.

In a case where the resin (B) contains resin particles, the proportion of the resin particles in the resin (B) is preferably greater than 50% by mass, more preferably 60% by mass or greater, and still more preferably 80% by mass or greater.

(Resin Particles)

The resin particles may contain one or two or more kinds of resins.

Specifically, the resin particles that may be contained in the resin (B) are resin particles formed of at least one selected from the group consisting of an acrylic resin, a polyester resin, and a urethane resin.

It is preferable that the resin particles that may be contained in the resin (B) include the main resin in the resin (B) (that is, the resin having the largest content mass in the resin (B)).

It is preferable that the resin contained in the resin particles is a water-insoluble resin.

In the present disclosure, the term "water-insoluble" in the water-insoluble resin indicates a property that the amount of substance to be dissolved in 100 g of water at 25° C. is less than 1.0 g (more preferably less than 0.5 g).

The volume average particle diameter of the resin particles is preferably in a range of 1 nm to 300 nm, more preferably in a range of 3 nm to 200 nm, and still more preferably in a range of 5 nm to 150 nm.

In the present disclosure, the volume average particle diameter indicates a value measured by a laser diffraction/scattering type particle size distribution meter.

Examples of the measuring device include a particle size distribution measuring device "Microtrac MT-3300II" (manufactured by Nikkiso Co., Ltd.).

In regard to the resin particles, for example, as an example of particles formed of an acrylic resin, the description in paragraphs 0137 to 0171 of WO2017/163738A and the description in paragraphs 0036 to 0081 of JP2010-077218A may be referred to.

From the viewpoint of improving the adhesiveness of an image to be obtained, the glass transition temperature (Tg) of the resin contained in the resin particles is preferably 100° C. or lower and more preferably 75° C. or lower.

In the present disclosure, the glass transition temperature of the resin indicates a value measured using differential scanning calorimetry (DSC).

Specifically, the glass transition temperature is measured in conformity with the method described in JIS K 7121 (1987) or JIS K 6240 (2011).

The glass transition temperature in the present disclosure is an extrapolated glass transition start temperature (hereinafter, also referred to as Tig).

The method of measuring the glass transition temperature will be described in more detail.

In a case where the glass transition temperature is acquired, the resin is maintained at a temperature lower than the expected glass transition temperature of the resin by approximately 50° C. until the device is stabilized, the resin is heated to a temperature higher than the temperature at which the glass transition is completed by approximately 30° C. at a heating rate of 20° C./min, and a differential thermal analysis (DTA) curve or a DSC curve is created.

The extrapolated glass transition start temperature (Tig), that is, the glass transition temperature in the present specification is acquired as the temperature of the intersection between a straight line obtained by extending the base line on a low temperature side in the DTA curve or the DSC curve onto a high temperature side and a tangent drawn at a point where the gradient of a curve from a step-like change portion of the glass transition is maximized.

Further, in a case where the resin particles contain two or more kinds of resins, the glass transition temperature (Tg) of the resin particles indicates the weighted average value of the glass transition temperatures of the respective resins.

The resin contained in the resin particles has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the resin contained in the resin particles.

From the viewpoint of further improving the dispersibility of the resin particles in water, it is preferable that the resin contained in the resin particles contains an ionic group in the structure.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The amount of the ionic group is preferably in a range of 0.001 mol to 1.0 mol and more preferably in a range of 0.01 mol to 0.5 mol, for example, per 100 g of the resin contained in the resin particles.

(Pigment Dispersion Resin)

The pigment dispersion resin is not particularly limited, and a known resin dispersant can be used.

Examples of the known resin dispersants include the resin dispersants described in JP5863600B, JP2018-28080A, JP2017-149906A, and JP2016-193981A.

An acrylic resin is preferable as the pigment dispersion resin.

The total content of the resin (B) is preferably in a range of 0.5% by mass to 10.0% by mass, more preferably in a range of 1.0% by mass to 8.0% by mass, and still more preferably 2.5% by mass to 7.0% by mass with respect to the total amount of the ink.

The SP value of the main resin in the resin (B) (that is, $SP_B$) is not particularly limited as long as the SP value satisfies Expression (C1).

$SP_B$ is preferably in a range of 10.0 to 30.0.

In a case where $SP_B$ is 30.0 or less, the adhesiveness and rub resistance (particularly, the rub resistance) of the image are further improved. $SP_B$ is more preferably 25.0 or less and still more preferably 22.5 or less.

In a case where $SP_B$ is 10.0 or greater, the range of selection of the main resin in the resin (B) is widened. $SP_B$ is more preferably 15.0 or greater.

<Organic Solvent (C)>

The ink according to the embodiment of the present disclosure contains an organic solvent (C).

The organic solvent (C) is an organic solvent having a boiling point of 250° C. or lower, containing no nitrogen atom, and satisfying Expression (C1) (that is, $|SP_C-SP_B|\leq 10.0$).

The ink according to the embodiment of the present disclosure may contain only one or two or more kinds of organic solvents (C).

In the present disclosure, the "boiling point" indicates a boiling point at 1 atm (101325 Pa).

In a case where the boiling point of the organic solvent (C) is 250° C. or lower, this contributes to improving the drying property of the image.

$SP_C$ is not particularly limited as long as $SP_C$ satisfies Expression (C1) (that is, $|SP_C-SP_B|\leq 10.0$). That is, the organic solvent (C) can be appropriately selected in consideration of the SP value (that is, $SP_B$) of the main resin in the resin (B).

$SP_C$ is preferably in a range of 10.0 to 30.0.

In a case where $SP_C$ is 30.0 or less, the adhesiveness and the rub resistance of the image (particularly the rub resistance) are further improved. $SP_C$ is more preferably 28.0 or less, still more preferably 26.0 or less, and even still more preferably 25.0 or less.

In a case where $SP_C$ is 10.0 or greater, the range of selection of the organic solvent (C) is widened. $SP_C$ is more preferably 15.0 or greater and still more preferably 17.5 or greater.

As described above, $|SP_C-SP_B|$ satisfies the expression of "$|SP_C-SP_B|\leq 10.0$" (that is, Expression (C1)). That is, $|SP_C-SP_B|$ is 10.0 or less. In this manner, the adhesiveness of the image and the rub resistance of the image are improved.

From the viewpoint of further improving the adhesiveness of the image and the rub resistance of the image, $|SP_C-SP_B|$ is preferably 8.5 or less, more preferably 7.5 or less, still more preferably 5.0 or less, and most preferably 3.0 or less.

The lower limit of $|SP_C-SP_B|$ is not particularly limited. That is, $|SP_C-SP_B|$ may be 0.

The organic solvent (C) is not particularly limited as long as the organic solvent (C) has a boiling point of 250° C. or lower, contains no nitrogen atom, and satisfies Expression (C1).

From the viewpoint of further improving the adhesiveness of the image and the rub resistance of the image, it is preferable that the organic solvent (C) contains at least one selected from the group consisting of a glycol compound, a glycol monoether compound, and a monoalcohol compound having 5 or more carbon atoms.

In this case, the total proportion of the glycol compound, the glycol monoether compound, and the monoalcohol compound having 5 or more carbon atoms in the organic solvent (C) is preferably in a range of 50% by mass to 100% by mass, more preferably in a range of 60% by mass to 100% by mass, and still more preferably in a range of 80% by mass to 100% by mass.

Examples of the glycol compound as the organic solvent (C) include dipropylene glycol (hereinafter, also referred to as DPG; the boiling point and the SP value thereof are described in the examples below), 1,2-hexanediol (hereinafter, also referred to as 1,2-HDO, the boiling point and the SP value thereof are described in the examples below), and 2-ethyl-1,3-hexanediol (hereinafter, also referred to as 2-ethyl-1,3-HDO; the boiling point and the SP value thereof are described in the examples below).

Examples of the glycol monoether compound as the organic solvent (C) include diethylene glycol monobutyl ether (hereinafter, also referred to as DEGmBE; the boiling point and the SP value thereof are described in the examples below), diethylene glycol monoethyl ether (hereinafter, also referred to as DEGmEE; the boiling point and the SP value thereof are described in the examples below), dipropylene glycol monomethyl ether (hereinafter, also referred to as DPGmME; the boiling point and the SP value thereof are described in the examples below), ethylene glycol monobutyl ether (a boiling point of 171° C. and an SP value of 21.8 $MPa^{1/2}$), propylene glycol monobutyl ether (hereinafter, also referred to as PGmBE; the boiling point and the SP value thereof are described in the examples below), ethylene glycol monopropyl ether (a boiling point of 151° C. and an SP value of 22.6 $MPa^{1/2}$), propylene glycol monopropyl ether (hereinafter, also referred to as PGmPE; the boiling point and the SP value thereof are described in the examples below), propylene glycol monoethyl ether (a boiling point of 132° C. and an SP value of 22.5 $MPa^{1/2}$), propylene glycol monomethyl ether (hereinafter, also referred to as PGmME; the boiling point and the SP value thereof are described in the examples below), and tripropylene glycol monomethyl ether (hereinafter, also referred to as TPGmME; the boiling point and the SP value thereof are described in the examples below).

Examples of the monoalcohol compound having 5 or more carbon atoms as the organic solvent (C) include 2-ethyl-1-hexanol (the boiling point and the SP value thereof are described in the examples below), 1-octanol (a boiling point of 196° C. and an SP value of 19.8 $MPa^{1/2}$), 2-octanol (a boiling point of 179° C. and an SP value of 20.1 $MPa^{1/2}$), 2-propyl-1-hexanol (a boiling point of 193° C. and an SP value of 19.4 $MPa^{1/2}$), 1-pentanol (a boiling point of 137° C. and an SP value of 21.4 $MPa^{1/2}$), 1-hexanol (a boiling point of 157° C. and an SP value of 20.7 $MPa^{1/2}$), and 1-decanol (a boiling point of 230° C. and an SP value of 19.2 $MPa^{1/2}$).

The monoalcohol compound having 5 or more carbon atoms as the organic solvent (C) has preferably 5 to 10 carbon atoms, more preferably 6 to 10 carbon atoms, still more preferably 7 to 10 carbon atoms, and even still more preferably 8 or 9 carbon atoms.

From the viewpoint of further improving the adhesiveness of the image and the rub resistance of the image, it is still more preferable that the organic solvent (C) contains at least one selected from the group consisting of a glycol monoether compound and a monoalcohol compound having 5 or more carbon atoms.

In this case, the total proportion of the glycol monoether compound and the monoalcohol compound having 5 or more carbon atoms in the organic solvent (C) is preferably in a range of 50% by mass to 100% by mass, more preferably in a range of 60% by mass to 100% by mass, and still more preferably in a range of 80% by mass to 100% by mass.

The total content of the organic solvent (C) is in a range of 0.01% by mass to 5.0% by mass with respect to the total amount of the ink.

In a case where the total content of the organic solvent (C) is 0.01% by mass or greater, the adhesiveness of the image and the rub resistance of the image are improved. The total content of the organic solvent (C) is preferably 0.05% by mass or greater, more preferably 0.1% by mass or greater, still more preferably 0.5% by mass or greater, and even still more preferably 1.0% by mass or greater.

In a case where the total content of the organic solvent (C) is 5.0% by mass or less, the drying property of the image is improved. The total content of the organic solvent (C) is preferably 4.0% by mass or less and more preferably 3.0% by mass or less.

<Water-Soluble Organic Solvent (D)>

The ink according to the embodiment of the present disclosure may further contain a water-soluble organic solvent (D) having a boiling point of 250° C. or lower and satisfying Expression (D1).

The ink may contain only one or two or more kinds of water-soluble organic solvents (D).

$$|SP_D - SP_B| > 10.0 \qquad \text{Expression (D1)}$$

In Expression (D1), $SP_B$ represents an SP value of a main resin in the resin (B) in an $MPa^{1/2}$ unit, $SP_D$ represents an SP value of the water-soluble organic solvent (D) in the $MPa^{1/2}$ unit, and $|SP_D - SP_B|$ represents an absolute value of a difference between $SP_D$ and $SP_B$.

In the present disclosure, the term "water-soluble" indicates a property that 1 g or greater (preferably 3 g or greater and more preferably 10 g or greater) of a substance is dissolved in 100 g of water at 25° C.

In a case where the ink according to the embodiment of the present disclosure contains the water-soluble organic solvent (D), the jettability of the ink is further improved. The reason for this is not clear, but it is considered that the water-soluble organic solvent (D) satisfying Expression (D1) is less likely to contribute to the film-forming property of the resin (B) unlike the above-described organic solvent (C), but instead works to further enhance the fluidity of the ink in a case of jetting the ink.

Further, in a case where the boiling point of the water-soluble organic solvent (D) is 250° C. or lower, the drying property of the image is preferably maintained.

$SP_D$ is not particularly limited as long as $SP_D$ satisfies Expression (D1) (that is, $|SP_C - SP_B| > 10.0$). That is, the water-soluble organic solvent (D) can be appropriately selected in consideration of the SP value (that is, $SP_B$) of the main resin in the resin (B).

$SP_D$ is preferably 30.0 or greater.

In a case where $SP_D$ is 30.0 or greater, Expression (D1) is easily satisfied.

$SP_D$ is preferably 50.0 or less and more preferably 40.0 or less.

As described above, $|SP_D - SP_B|$ satisfies the expression of "$|SP_D - SP_B| > 10.0$" (that is, Expression (D1)). That is, $|SP_D - SP_B|$ is greater than 10.0. In this manner, the jettability of the ink is further improved.

In $SP_D$ and $SP_B$, the value obtained by subtracting $SP_B$ from $SP_D$ (that is, $SP_D - SP_B$) is preferably greater than 10.0.

The upper limit of $|SP_D - SP_B|$ is not particularly limited.

From the viewpoint that the range of selection of the water-soluble organic solvent (D) is widened, the upper limit of $|SP_D - SP_B|$ (preferably the upper limit of the value obtained by subtracting $SP_B$ from $SP_D$) is preferably 50.0 and more preferably 40.0.

The water-soluble organic solvent (D) is not particularly limited as long as the water-soluble organic solvent (D) has a boiling point of 250° C. or lower and satisfies Expression (D1).

From the viewpoint of further improving the drying property of the image, it is preferable that the water-soluble organic solvent (D) does not have a nitrogen atom.

Further, from the viewpoint of further improving the jettability of the ink, it is preferable that the water-soluble organic solvent (D) is at least one selected from the group consisting of a glycol compound.

Examples of the glycol compound serving as the water-soluble organic solvent (D) include propylene glycol (hereinafter, also referred to as PG; the boiling point and the SP value thereof are described in the examples below) and diethylene glycol (hereinafter, also referred to as DEG; the boiling point and the SP value thereof are described in the examples below).

Further, in a case where Expression (D1) is satisfied even with a compound exemplified as the glycol compound serving as the organic solvent (C) described above, the compound may also be used as the glycol compound serving as the water-soluble organic solvent (D).

Further, in a case where the ink contains the water-soluble organic solvent (D), the total content of the water-soluble organic solvent (D) is preferably in a range of 5% by mass to 40% by mass with respect to the total amount of the ink.

In a case where the total content of the water-soluble organic solvent (D) is 5% by mass or greater, the jettability of the ink is further improved. From the viewpoint of further improving the jettability of the ink, the total content of the water-soluble organic solvent (D) is more preferably 10% by mass or greater, still more preferably 15% by mass or greater, and even still more preferably 20% by mass or greater.

In a case where the total content of the water-soluble organic solvent (D) is 40% by mass or less, the drying property of the image is further improved. From the viewpoint of further improving the drying property of the image, the total content of the water-soluble organic solvent (D) is more preferably 35% by mass or less and still more preferably 30% by mass or less.

<Colorant>

The ink according to the embodiment of the present disclosure may further contain a colorant.

Examples of the colorant include an organic pigment, an inorganic pigment, and a dye.

Examples of the organic pigment include an azo pigment, a polycyclic pigment, a chelate dye, a nitro pigment, a nitroso pigment, and aniline black.

Examples of the inorganic pigment include a white inorganic pigment, iron oxide, barium yellow, cadmium red, chrome yellow, and carbon black.

Preferred examples of the colorant include the colorants described in paragraphs 0096 to 0100 of JP2009-241586A.

It is preferable that the colorant contains a white inorganic pigment. The ink in this case can be suitably used as, for example, a white ink. Further, in a case where the ink contains, as the colorant, a white inorganic pigment and a pigment of a color other than white, the ink can also be used as an ink in which a chromatic tint is added to the white color.

Examples of the white inorganic pigment include titanium dioxide ($TiO_2$), barium sulfate, calcium carbonate, aluminum hydroxide, silica, zinc oxide, zinc sulfide, mica, talc, and pearl. Among the examples of the white inorganic pigment, titanium dioxide, barium sulfate, calcium carbonate, or zinc oxide is preferable, and titanium dioxide is more preferable.

The ink containing a white inorganic pigment is required to have a property of concealing a base (for example, an impermeable base material or a chromatic image recorded on an impermeable base material) (hereinafter, also referred to as "concealability") using an image formed of the ink (for example, a white image).

In some cases, a white inorganic pigment having a large particle diameter (for example, having an average primary particle diameter of 150 nm or greater) is selected as the white inorganic pigment in order to enhance the concealability, and the content of the white inorganic pigment in the ink is set to be large (for example, 3% by mass or greater). In such a case, the resin (B) in the ink may be required to have a higher film-forming property in order for film formation using the ink for each pigment.

The ink according to the embodiment of the present disclosure also satisfies such a requirement.

The average primary particle diameter of the white inorganic pigment is, for example, in a range of 150 nm to 400 nm.

In a case where the average primary particle diameter thereof is 150 nm or greater, the concealability is further improved. Further, in a case where the average primary particle diameter thereof is 400 nm or less, the jettability of the ink is further improved.

The average primary particle diameter of the white inorganic pigment is preferably in a range of 250 nm to 350 nm and more preferably in a range of 250 nm to 300 nm.

The average primary particle diameter of the white inorganic pigment is a value measured using a transmission electron microscope (TEM). A transmission electron microscope 1200EX (manufactured by JEOL Ltd.) can be used for the measurement.

Specifically, the average primary particle diameter is defined as a value obtained by adding the ink diluted to 1000 times dropwise to Cu200 mesh (manufactured by JEOL Ltd.) to which a carbon film has been attached, drying the ink, measuring the equivalent circle diameters of 300 independent particles that do not overlap each other in the image enlarged at a magnification of 100000 times using a TEM, and simply averaging the measured values.

The content of the white inorganic pigment is preferably in a range of 1% by mass to 20% by mass, more preferably in a range of 3% by mass to 17% by mass, and still more preferably in a range of 5% by mass to 15% by mass with respect to the total amount of the ink.

In a case where the content of the white inorganic pigment is 1% by mass or greater, the concealability is further improved.

Further, in a case where the content of the white inorganic pigment is 20% by mass or less, the adhesiveness of the image and the rub resistance of the image are further improved.

<Other Components>

The ink according to the embodiment of the present disclosure may contain components other than the components described above.

Examples of other components include a surfactant, a wax, a fading inhibitor, an emulsion stabilizer, a penetration enhancer, an ultraviolet absorbing agent, a preservative, an antibacterial agent, a pH adjuster (a neutralizer such as an organic base or inorganic alkali), an antifoaming agent, a viscosity adjuster, a dispersion stabilizer, a rust inhibitor, and a chelating agent.

<Preferable Physical Properties of Ink>

The viscosity of the ink according to the embodiment of the present disclosure is preferably in a range of 1.2 mPa·s to 15.0 mPa·s, more preferably 2 mPa·s or greater and less than 13 mPa·s, and preferably 2.5 mPa·s or greater and less than 10 mPa·s.

The viscosity is a value measured at 25° C. using a viscometer.

As the viscometer, for example, a VISCOMETER TV-22 type viscometer (manufactured by Toki Sangyo Co., Ltd.) can be used.

The surface tension of the ink according to the embodiment of the present disclosure is preferably in a range of 25 mN/m to 40 mN/m and more preferably in a range of 27 mN/m to 37 mN/m.

The surface tension is a value measured at a temperature of 25° C.

The surface tension can be measured using, for example, an Automatic Surface Tentiometer CBVP-Z (manufactured by Kyowa Interface Science Co., Ltd.).

From the viewpoint of the dispersion stability, the pH of the ink according to the embodiment of the present disclosure at 25° C. is preferably in a range of 6 to 11, more preferably in a range of 7 to 10, and still more preferably in a range of 7 to 9.

The pH is a value measured at 25° C. using a commercially available pH meter.

The ink according to the embodiment of the present disclosure can be used for image recording by a coating method, an immersion method, a gravure method, a flexo method, an ink jet method, or the like.

It is preferable that the ink according to the embodiment of the present disclosure is used particularly for image recording by an ink jet method (that is, used as an inkjet ink).

[Image Recording Method]

An image recording method according to the embodiment of the present disclosure includes a step of applying the above-described ink according to the embodiment of the present disclosure onto an impermeable base material to record an image (hereinafter, also referred to as an "image recording step").

The image recording method according to the embodiment of the present disclosure may include other steps as necessary.

Further, in the image recording step, the ink according to the embodiment of the present disclosure is not limited to being directly applied to the surface of the impermeable base material. The ink according to the embodiment of the present disclosure may be applied, for example, onto another image recorded on the impermeable base material.

The image recording method according to the embodiment of the present disclosure is an image recording method carried out using the ink according to the embodiment of the present disclosure.

Therefore, according to the image recording method according to the embodiment of the present disclosure, an image with excellent adhesiveness (that is, the adhesiveness to the impermeable base material), excellent rub resistance, and an excellent drying property can be recorded on the impermeable base material.

<Impermeable Base Material>

In the image recording method according to the embodiment of the present disclosure, an impermeable base material is used.

The impermeable base material indicates a base material having a water absorption rate (% by mass, 24 hr.) of less than 0.2 according to ASTMD 570 of the ASTM test method.

The impermeable base material is not particularly limited, but a resin base material is preferable.

The resin base material is not particularly limited, and examples thereof include a thermoplastic resin base material.

Examples of the resin base material include a base material obtained by molding a thermoplastic resin in the form of a sheet or film.

As the resin base material, a base material containing polypropylene, polyethylene terephthalate, nylon, polyethylene, or polyimide is preferable.

The resin base material may be a transparent resin base material or a colored resin base material.

Here, the term "transparent" indicates that the transmittance of visible light having a wavelength of 400 nm to 700 nm is 80% or greater (preferably 90% or greater).

The shape of the resin base material is not particularly limited, but a sheet-shaped resin base material is preferable. From the viewpoint of the productivity of a recording medium, a sheet-shaped resin base material which is capable of forming a roll by being wound is more preferable.

The thickness of the resin base material is preferably in a range of 10 μm to 200 μm and more preferably in a range of 10 μm to 100 μm.

The resin base material may be subjected to a surface treatment from the viewpoint of improving the surface energy.

Examples of the surface treatment include a corona treatment, a plasma treatment, a flame treatment, a heat treatment, an abrasion treatment, a light irradiation treatment (UV treatment), and a flame treatment, but the present invention is not limited thereto.

<Image Recording Step>

As the method of applying the ink in the image recording step, a known method such as a coating method, an ink jet method, or an immersion method can be applied.

Among these, the ink jet method is preferable.

The ink jet system in the ink jet method is not particularly limited, and any of known systems such as an electric charge control method of allowing an ink to be jetted using electrostatic attraction force; a drop-on-demand method (pressure pulse method) using a vibration pressure of a piezoelectric element; an acoustic ink jet system of allowing an ink to be jetted using a radiation pressure by converting an electric signal into an acoustic beam and irradiating the ink with the acoustic beam; and a thermal ink jet (bubble jet (registered trademark)) system of heating an ink to form bubbles and utilizing the generated pressure may be used.

As an ink jet method, particularly, an ink jet method, described in JP1979-059936A (JP-S54-059936A), of jetting an ink from a nozzle using an action force caused by a rapid change in volume of the ink after being subjected to an action of thermal energy can be effectively used.

Further, the method described in paragraphs 0093 to 0105 of JP2003-306623A can also be applied as the ink jet method.

The ink according to the ink jet method is applied onto the impermeable base material by allowing the ink to be jetted from a nozzle of an ink jet head.

Examples of the system of the ink jet head include a shuttle system of performing recording while scanning a short serial head in a width direction of a recording medium and a line system of using a line head in which recording elements are aligned in correspondence with the entire area of one side of a recording medium.

In the line system, image recording can be performed on the entire surface of the recording medium by scanning the recording medium in a direction intersecting the direction in which the recording elements are aligned. In the line system, a transport system such as a carriage that scans a short head in the shuttle system is not necessary. Further, in the line system, since the movement of a carriage and complicated scanning control between the head and the recording medium are not necessary as compared with the shuttle system, only the recording medium moves. Therefore, according to the line system, image recording at a higher speed than that of the shuttle system can be realized.

It is preferable to apply the ink using an ink jet head having a resolution of 300 dpi or greater (more preferably 600 dpi and still more preferably 800 dpi). Here, dpi stands for dot per inch, and 1 inch is 2.54 cm.

From the viewpoint of obtaining a high-definition image, the liquid droplet amount of the ink to be jetted from the nozzle of the ink jet head is preferably in a range of 1 pL (pico liter) to 10 pL and more preferably in a range of 1.5 pL to 6 pL.

In addition, from the viewpoint of improving the image irregularity and connection of continuous gradations, it is also effective that the ink is jetted by combining different amounts of liquid droplets.

In the image recording step, an image may be obtained by heating and drying the ink applied onto the impermeable base material.

Examples of the means for heating and drying the ink include known heating means such as a heater, known air blowing means such as a dryer, and means for combining these.

Examples of the method of performing heating and drying the ink include a method of applying heat from a side of the impermeable base material opposite to the surface onto which the ink has been applied using a heater or the like, a method of applying warm air or hot air to the surface of the impermeable base material onto which the ink has been applied, a method of applying heat using an infrared heater from the surface of the impermeable base material onto which the ink has been applied or from a side of the impermeable base material opposite to the surface onto which the ink has been applied, and a method of combining a plurality of these methods.

The heating temperature of heating and drying the ink composition is preferably 55° C. or higher, more preferably 60° C. or higher, and particularly preferably 65° C. or higher. The upper limit of the heating temperature is not particularly limited, and the upper limit thereof may be 100° C. and preferably 90° C.

The time of heating and drying the ink is not particularly limited, but is preferably in a range of 3 seconds to 60 seconds, more preferably in a range of 5 seconds to 60 seconds, and particularly preferably in a range of 10 seconds to 45 seconds.

Further, the impermeable base material may be heated in advance before the application of the ink.

The heating temperature may be appropriately set, but the temperature of the impermeable base material is preferably in a range of 20° C. to 50° C. and more preferably in a range of 25° C. to 40° C.

In the image recording step, an image may be formed by applying two or more kinds of inks corresponding to the ink according to the embodiment of the present disclosure. As the two or more kinds of inks in this case, for example, a first ink containing a white inorganic pigment and a second ink containing a colorant of a color other than white without containing a white inorganic pigment can be used. As a more specific embodiment of this case, first, an embodiment in which an image of characters, figures, and the like is recorded by the second ink on a transparent resin base material serving as an impermeable base material, and an image (for example, a solid image) is recorded by the first ink so as to cover the image recorded by the second ink and an image non-forming area of the impermeable base material is exemplified. In this case, the image of characters, figures, and the like recorded by the second ink is visually recognized through the impermeable base material from the side of the rear surface (that is, the side opposite to the side where the image is formed) of the impermeable base material.

Further, the image recording method according to the embodiment of the present disclosure may include the image recording step (hereinafter, also referred to as a "first image recording step") using the ink according to the embodiment of the present disclosure and a second image recording step using an ink that does not correspond to the ink according to the embodiment of the present disclosure.

As a specific embodiment in this case, an embodiment in which an ink A containing a white inorganic pigment is used as the ink according to the embodiment of the present disclosure and an ink B containing a colorant of a color other than white without containing a white inorganic pigment is used as the ink that does not correspond to the ink according to the embodiment of the present disclosure is exemplified. As a more specific embodiment in this case, first, an embodiment in which an image of characters, figures, and the like is recorded by the ink B on a transparent resin base material serving as an impermeable base material by performing the second image recording step, and an image (for example, a solid image) is recorded by the ink A so as to cover the image recorded by the second ink and the image non-forming area of the impermeable base material by performing the first image recording step is exemplified. In this case, the image of characters, figures, and the like recorded by the ink B is visually recognized through the impermeable base material from the side of the rear surface (that is, the surface on the side opposite to the surface on which the image is formed) of the impermeable base material.

It is preferable to use an aqueous ink as the ink B, similar to the ink A. Specific examples of the ink B include an ink which is the same as the ink according to the embodiment of the present disclosure except that the ink does not contain the white inorganic pigment and the organic solvent (C).

<Step of Applying Treatment Liquid>

The image recording method according to the embodiment of the present disclosure may include a step of applying a treatment liquid, which contains an aggregating agent allowing components in the ink to be aggregated, onto the impermeable base material (hereinafter, also referred to as a "treatment liquid application step") before the image recording step described above.

In this case, in the image recording step, an image is recorded by applying the ink according to the embodiment of the present disclosure onto at least a part of the surface of the impermeable base material to which the treatment liquid has been applied.

In a case where the image recording method according to the embodiment of the present disclosure includes the first image recording step and the second image recording step described above and also includes the treatment liquid application step, it is preferable that the treatment liquid application step, the second image recording step, and the first image recording step are performed in order.

In a case where the image recording method according to the embodiment of the present disclosure includes the treatment liquid application step, the aggregating agent allows the components (for example, the resin (B)) in the ink to be aggregated on the impermeable base material. In this manner, high-speed image recording is realized. Further, the adhesiveness of the image and the rub resistance of the image are further improved.

The application of the treatment liquid onto the impermeable base material can be performed by applying a known method such as a coating method, an ink jet method, or an immersion method.

Examples of the coating method include known coating methods using a bar coater (such as a wire bar coater), an extrusion die coater, an air doctor coater, a blade coater, a rod coater, a knife coater, a squeeze coater, a reserve roll coater, a gravure coater, or a flexo coater.

The details of the ink jet method are the same as the details of the ink jet method which can be applied to the image recording step described above.

Further, the impermeable base material may be heated before the application of the treatment liquid in the treatment liquid application step.

The heating temperature is set such that the temperature of the impermeable base material is preferably in a range of 20° C. to 50° C. and more preferably in a range of 25° C. to 40° C.

In the treatment liquid application step, the treatment liquid may be heated and dried after the application of the treatment liquid and before the image recording step described above.

Examples of the means for heating and drying the treatment liquid include known heating means such as a heater, known air blowing means such as a dryer, and means for combining these.

Examples of the method of heating and drying the treatment liquid include a method of applying heat from a side of the impermeable base material opposite to the surface to which the treatment liquid has been applied using a heater or the like, a method of applying warm air or hot air to the surface of the impermeable base material to which the treatment liquid has been applied, a method of applying heat from the surface of the impermeable base material to which the treatment liquid has been applied or from a side of the impermeable base material opposite to the surface to which the treatment liquid has been applied using an infrared heater, and a method of combining a plurality of these methods.

The heating temperature the treatment liquid in a case of heating and drying the treatment liquid is preferably 35° C. or higher and more preferably 40° C. or higher.

The upper limit of the heating temperature is not particularly limited, and the upper limit thereof is preferably 100° C., more preferably 90° C., and still more preferably 70° C.

The time of heating and drying the treatment liquid is not particularly limited, but is preferably in a range of 0.5 seconds to 60 seconds, more preferably in a range of 0.5 seconds to 20 seconds, and particularly preferably in a range of 0.5 seconds to 10 seconds.

Hereinafter, the details of the treatment liquid used in the image recording method according to the embodiment of the present disclosure will be described.

(Treatment Liquid)

The treatment liquid contains an aggregating agent that allows the components in the ink to be aggregated.

It is preferable that the treatment liquid contains at least one selected from the group consisting of a polyvalent metal compound, an organic acid, a metal complex, and a water-soluble cationic polymer as the aggregating agent.

It is preferable that the aggregating agent contains an organic acid.

—Polyvalent Metal Compound—

Examples of the polyvalent metal compound include alkaline earth metals of a group 2 (such as magnesium and calcium) in the periodic table, transition metals of a group 3 (such as lanthanum) in the periodic table, cations of a group 13 (such as aluminum) in the periodic table, and salts of lanthanides (such as neodymium).

As salts of these metals, salts of organic acids, a nitrate, a chloride, and a thiocyanate described below are suitable.

Among these, a calcium salt or magnesium salt of an organic acid (such as formic acid, acetic acid, or a benzoate), a calcium salt or magnesium salt of nitric acid, calcium chloride, magnesium chloride, and a calcium salt or magnesium salt of thiocyanic acid are preferable.

Further, it is preferable that at least a part of the polyvalent metal compound is dissociated into polyvalent metal ions and counter ions in the treatment liquid.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the treatment liquid.

Preferred examples of the organic compound containing a carboxy group include polyacrylic acid, acetic acid, formic acid, benzoic acid, glycolic acid, malonic acid, malic acid (preferably DL-malic acid), maleic acid, succinic acid, glutaric acid, fumaric acid, citric acid, tartaric acid, phthalic acid, 4-methylphthalic acid, lactic acid, pyrrolidone carboxylic acid, pyrrone carboxylic acid, pyrrole carboxylic acid, furan carboxylic acid, pyridine carboxylic acid, coumarinic acid, thiophene carboxylic acid, and nicotinic acid.

These compounds may be used alone or in combination of two or more kinds thereof.

From the viewpoint of the aggregation rate of the ink, as the organic compound containing a carboxy group, di- or higher valent carboxylic acid (hereinafter, also referred to as polycarboxylic acid) is preferable, and dicarboxylic acid is more preferable.

As the dicarboxylic acid, malonic acid, malic acid, maleic acid, succinic acid, glutaric acid, fumaric acid, tartaric acid, 4-methylphthalic acid, or citric acid is preferable, and malonic acid, malic acid, tartaric acid, glutaric acid, or citric acid is more preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group can be reduced by bringing the ink into contact with an organic acidic compound having a lower pKa to degrade the dispersion stability.

It is preferable that the organic acid has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

—Metal Complex—

As the metal complex, a metal complex including at least one selected from the group consisting of zirconium, aluminum, and titanium as a metal element is preferable.

As the metal complex, a metal complex including at least one selected from the group consisting of acetate, acetylacetonate, methylacetoacetate, ethylacetoacetate, octylene glycolate, butoxyacetylacetonate, lactate, lactate ammonium salt, and triethanol aminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

—Water-Soluble Cationic Polymer—

Examples of the water-soluble cationic polymer include polyallylamine, polyallylamine derivatives, poly-2-hydroxypropyldimethylammonium chloride, and poly(diallyldimethylammonium chloride).

The water-soluble cationic polymer can refer to the descriptions in known documents such as JP2011-042150A (particularly, paragraph 0156) and JP2007-098610A (particularly, paragraphs 0096 to 0108) as appropriate.

Examples of commercially available products of the water-soluble cationic polymer include SHALLOL (registered trademark) DC-303P and SHALLOL DC-902P (both manufactured by DKS Co., Ltd.), CATIOMASTER (registered trademark) PD-land CATIOMASTER PD-30 (both manufactured by Yokkaichi Chemical Co., Ltd.) and UNISENCE FPA100L (manufactured by Senka Corporation).

The content of the aggregating agent is not particularly limited.

From the viewpoint of the aggregation rate of the ink, the content of the aggregating agent is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the treatment liquid.

—Water—

It is preferable that the treatment liquid contains water.

The content of water is preferably in a range of 50% by mass to 90% by mass and more preferably in a range of 60% by mass to 80% by mass with respect to the total mass of the treatment liquid.

—Resin Particles—

The treatment liquid may contain resin particles. In a case where the treatment liquid contains resin particles, an image with excellent adhesiveness can be obtained.

As the resin particles, particles which are the same as the resin particles which may be contained in the ink described above can be used.

The content of resin particles is not particularly limited.

The content of the resin particles is preferably in a range of 0.5% by mass to 30% by mass, more preferably in a range of 1% by mass to 20% by mass, and particularly preferably in a range of 1% by mass to 15% by mass with respect to the total mass of the treatment liquid.

—Water-Soluble Solvent—

It is preferable that the treatment liquid contains at least one kind of water-soluble solvent.

As the water-soluble solvent, known solvents can be used without particular limitation.

Examples of the water-soluble solvent include polyhydric alcohol such as glycerin, 1,2,6-hexanetriol, trimethylolpropane, alkanediol (such as ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), or polyalkylene glycol (such as diethylene glycol, triethylene glycol, tetraethylene glycol, pentaethylene glycol, dipropylene glycol, or polyoxyethylene polyoxypropylene glycol); polyhydric alcohol ether such as polyalkylene glycol ether (such as diethylene glycol monoalkyl ether, triethylene glycol monoalkyl ether, tripropylene glycol monoalkyl ether, or polyoxypropylene glyceryl ether); and saccharides, sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-042150A.

Among these, from the viewpoint of suppressing transfer of components, polyhydric alcohol or polyhydric alcohol ether is preferable, and alkanediol, polyalkylene glycol, or polyalkylene glycol ether is more preferable.

—Surfactant—

The treatment liquid may contain at least one kind of surfactant.

The surfactant can be used as a surface tension adjuster or an antifoaming agent. Examples of the surface tension adjuster or the antifoaming agent include a non-ionic surfactant, a cationic surfactant, an anionic surfactant, and a betaine surfactant. Among these, from the viewpoint of the aggregation rate of the ink, a non-ionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl-based) surfactants and silicone-based surfactants described in JP2003-322926A, JP2004-325707A, and JP2004-309806A.

For example, in a case where the treatment liquid contains a surfactant as an antifoaming agent, the content of the surfactant as an antifoaming agent is preferably in a range of 0.0001% by mass to 1% by mass and more preferably in a range of 0.001% by mass to 0.1% by mass with respect to the total amount of the treatment liquid.

Other Components

The treatment liquid may contain other components in addition to the above-described components as necessary.

Examples of other components that may be contained in the treatment liquid include known additives such as a solid wetting agent, colloidal silica, an inorganic salt, a fading inhibitor, an emulsion stabilizer, a penetration enhancer, an ultraviolet absorbing agent, a preservative, an antibacterial agent, a pH adjuster, a viscosity adjuster, a rust inhibitor, a chelating agent, and a water-soluble polymer compound other than a water-soluble cationic polymer (for example, water-soluble polymer compounds described in paragraphs 0026 to 0080 of JP2013-001854A).

(Physical Properties of Treatment Liquid)

From the viewpoint of the aggregation rate of the ink, the pH of the treatment liquid at 25° C. is preferably in a range of 0.1 to 3.5.

In a case where the pH of the treatment liquid is 0.1 or greater, the roughness of the impermeable base material is further reduced and the adhesiveness of the image area is further improved.

In a case where the pH of the treatment liquid is 3.5 or less, the aggregation rate is further improved, coalescence of dots (ink dots) caused by the ink on the surface of the impermeable base material is further suppressed, and the roughness of the image is further reduced.

The pH of the treatment liquid at 25° C. is more preferably in a range of 0.2 to 2.0. The conditions for measuring the pH of the treatment liquid at 25° C. are the same as the conditions for measuring the pH of the ink at 25° C. described above.

In the case where the treatment liquid contains an aggregating agent, from the viewpoint of the aggregation rate of the ink, the viscosity of the treatment liquid is preferably in a range of 0.5 mPa·s to 10 mPa·s and more preferably in a range of 1 mPa·s to 5 mPa·s. The conditions for measuring the viscosity of the treatment liquid here are the same as the conditions for measuring the viscosity of the ink described above.

The surface tension of the treatment liquid at 25° C. is preferably 60 mN/m or less, more preferably in a range of 20 mN/m to 50 mN/m, and still more preferably in a range of 30 mN/m to 45 mN/m. The conditions for measuring the surface tension of the treatment liquid here are the same as the conditions for measuring the surface tension of the ink described above.

EXAMPLES

Hereinafter, examples of the present disclosure will be described below, but the present disclosure is not limited to the following examples.

<Preparation of Aqueous Dispersion Liquid of Resin Particles>

As described below, an aqueous dispersion liquid of acryl 1, an aqueous dispersion liquid of acryl 2, an aqueous dispersion liquid of acryl 3, an aqueous dispersion liquid of urethane 1, an aqueous dispersion liquid of polyester 1, and an aqueous dispersion liquid of an olefin-maleic acid anhydride copolymer 1 were respectively prepared as aqueous dispersion liquids of resin particles.

Here, the resin particles (that is, the acryl 1, the acryl 2, the acryl 3, the urethane 1, and the polyester 1) are resin particles formed of the main resins in the resin (B).

The olefin-maleic acid anhydride copolymer 1 is resin particles formed of comparative resins.

The SP values ($SP_B$) of the resins (that is, the main resins in the resin (B)) contained in these resin particles are as listed in Table 1.

(Preparation of Aqueous Dispersion Liquid of Acryl 1)

The aqueous dispersion liquid of the acryl 1 was prepared as follows.

A 2 L three-neck flask (reaction container) provided with a stirrer, a thermometer, a reflux cooling pipe, and a nitrogen gas introduction pipe was charged with 560.0 g of methyl ethyl ketone, and the solution was heated to 87° C. Next, a mixed solution formed of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by FUJIFILM Wako Pure Chemical Corporation, dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1) . . . A solution formed of 1.16 g of "V-601" and 6.4 g of methyl ethyl ketone was added to the solution, and the resulting solution was stirred for 2 hours.

Next, the operation of the step (1) was repeatedly performed four times, a solution formed of 1.16 g of "V-601" and 6.4 g of methyl ethyl ketone was added to the solution, and the resulting solution was stirred for 3 hours (the operation carried out so far is referred to as the "reaction").

After completion of the reaction, the temperature of the solution was lowered to 65° C., 163.0 g of isopropanol was added thereto, and the solution was allowed to be naturally cooled, thereby obtaining a polymerization solution containing a copolymer (concentration of solid contents of 41.0% by mass).

Next, 317.3 g of the obtained polymerization solution was weighed, 46.4 g of isopropanol, 1.65 g of a 20% maleic acid anhydride aqueous solution (water-soluble acidic compound, corresponding to 0.3% by mass as maleic acid with respect to the copolymer), and 40.77 g of a 2 mol/L sodium hydroxide (NaOH) aqueous solution were added to the solution, and the temperature of the liquid in the reaction container was increased to 70° C.

Next, 380 g of distilled water was added dropwise to the liquid which had been heated to 70° C., at a speed of 10 mL/min, to carry out dispersion in water (dispersion step).

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step). 0.278 g (440 ppm as benzisothiazolin-3-one as the solid content in the polymer) of PROXEL GXL (S) (manufactured by Arch Chemicals, Inc.) was added to the obtained liquid.

The obtained liquid was filtered through a filter with a mesh size of 1 and the filtrate was collected, thereby obtaining an aqueous dispersion liquid of the acryl 1 (concentration of nonvolatile content of 23.2% by mass) as a copolymer of methyl methacrylate, isobornyl methacrylate, methacrylic acid, and sodium methacrylate (=70/20/5/5 [mass ratio]). The volume average particle diameter of the acryl 1 was 5.0 nm, and the weight-average molecular weight (Mw) of the acryl 1 was 60000.

(Preparation of Aqueous Dispersion Liquid of Acryl 2)

The aqueous dispersion liquid of the acryl 2 was prepared as follows.

A 2 L three-neck flask (reaction container) provided with a stirrer, a thermometer, a reflux cooling pipe, and a nitrogen gas introduction pipe was charged with 560.0 g of methyl ethyl ketone, and the solution was heated to 87° C. Next, a mixed solution formed of 135.1 g of methyl methacrylate, 452.4 g of t-butyl acrylate, 156.6 g of aminomethyl polystyrene, 108 g of methyl ethyl ketone, and 2.78 g of "V-601" (polymerization initiator, manufactured by FUJIFILM Wako Pure Chemical Corporation, dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1) . . . A solution formed of 1.39 g of "V-601" and 7.7 g of methyl ethyl ketone was added to the solution, and the resulting solution was stirred for 2 hours.

Next, the operation of the step (1) was repeatedly performed four times, a solution formed of 1.39 g of "V-601" and 7.7 g of methyl ethyl ketone was added to the solution, and the resulting solution was stirred for 3 hours (the operation carried out so far is referred to as the "reaction").

After completion of the reaction, the temperature of the solution was lowered to 65° C., 196.0 g of isopropanol was added thereto, and the solution was allowed to be naturally cooled, thereby obtaining a polymerization solution containing a copolymer.

Next, the polymerization solution was heated to 70° C., 410 g of distilled water was added dropwise to the polymerization solution, which had been heated to 70° C., at a speed of 10 mL/min, to carry out dispersion in water (dispersion step).

Thereafter, a total amount of 292.3 g of isopropanol, methyl ethyl ketone, and distilled water was distilled off by maintaining the temperature of the liquid in the reaction container at 70° C. for 1.5 hours under reduced pressure (solvent removal step). 0.278 g (440 ppm as benzisothiazolin-3-one as the solid content in the polymer) of PROXEL GXL (S) (manufactured by Arch Chemicals, Inc.) was added to the obtained liquid.

The obtained liquid was filtered through a filter with a mesh size of 1 μm and the filtrate was collected, thereby obtaining an aqueous dispersion liquid of the acryl 2 (concentration of nonvolatile content of 24.6% by mass) as a copolymer of methyl methacrylate, t-butyl acrylate, and aminomethyl polystyrene (=43/30/27 [mass ratio]). The volume average particle diameter of the acryl 2 was 20.3 nm, and the weight-average molecular weight (Mw) of the acryl 2 was 55000.

(Preparation of Aqueous Dispersion Liquid of Acryl 3)

The aqueous dispersion liquid of the acryl 3 was prepared as follows.

A 2 L three-neck flask (reaction container) provided with a stirrer, a thermometer, a reflux cooling pipe, and a nitrogen gas introduction pipe was charged with 560.0 g of methyl ethyl ketone, and the solution was heated to 87° C. Next, a mixed solution formed of 310.4 g of methyl methacrylate, 210.7 g of 2-ethylhexyl methacrylate, 155 g of methyl ethyl ketone, and 2.22 g of "V-601" (polymerization initiator, manufactured by FUJIFILM Wako Pure Chemical Corporation, dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1) . . . A solution formed of 1.11 g of "V-601" and 6.8 g of methyl ethyl ketone was added to the solution, and the resulting solution was stirred for 2 hours.

Next, the operation of the step (1) was repeatedly performed four times, a solution formed of 1.11 g of "V-601" and 6.8 g of methyl ethyl ketone was added to the solution, and the resulting solution was stirred for 3 hours (the operation carried out so far is referred to as the "reaction").

After completion of the reaction, the temperature of the solution was lowered to 65° C., 184.9 g of isopropanol was added thereto, and the solution was allowed to be naturally cooled, thereby obtaining a polymerization solution containing a copolymer.

Next, the polymerization solution was heated to 70° C., 357 g of distilled water was added dropwise to the polymerization solution, which had been heated to 70° C., at a speed of 10 ml/min, to carry out dispersion in water (dispersion step).

Thereafter, a total amount of 274.6 g of isopropanol, methyl ethyl ketone, and distilled water was distilled off by maintaining the temperature of the liquid in the reaction container at 70° C. for 1.2 hours under reduced pressure (solvent removal step). 0.278 g (440 ppm as benzisothiazolin-3-one as the solid content in the polymer) of PROXEL GXL (S) (manufactured by Arch Chemicals, Inc.) was added to the obtained liquid.

The obtained liquid was filtered through a filter with a mesh size of 1 μm, and the filtrate was collected, thereby obtaining an aqueous dispersion liquid of the acryl 3 (concentration of nonvolatile content of 25.8% by mass) as a copolymer of methyl methacrylate and 2-ethyl methacrylate (=60/40 [mass ratio]). The volume average particle diameter of the acryl 3 was 52.4 nm, and the weight-average molecular weight (Mw) of the acryl 3 was 22000.

(Preparation of Aqueous Dispersion Liquid of Urethane 1)

As the aqueous dispersion liquid of the urethane 1, a urethane emulsion "WBR-2101" (concentration of nonvolatile content of 27% by mass) (manufactured by Taisei Fine Chemical Co., Ltd.) was prepared.

(Preparation of Aqueous Dispersion Liquid of Polyester 1)

As the aqueous dispersion liquid of the polyester 1, a polyester emulsion "WR-961" (concentration of nonvolatile content of 30% by mass) (manufactured by Nippon Synthetic Chemical Industry Co., Ltd.) was prepared.

(Preparation of Aqueous Dispersion Liquid of Olefin-Maleic Acid Anhydride Copolymer 1)

An aqueous dispersion liquid of a pigment dispersion resin 1 in Example 1 of JP2014-210837A was prepared and used as the aqueous dispersion liquid of the olefin-maleic acid anhydride copolymer 1.

<Preparation of Titanium Dioxide ($TiO_2$) Aqueous Dispersion Liquid>

(Synthesis of Pigment Dispersion Resin P-1)

In the following manner, a pigment dispersion resin P-1 for dispersing titanium dioxide ($TiO_2$) in water was synthesized.

Here, the pigment dispersion resin P-1 is a resin other than the main resin in the resin (B).

The same mass of dipropylene glycol as the total amount of monomers described below was added to a three-neck flask equipped with a stirrer and a cooling pipe and heated to 85° C. in a nitrogen atmosphere.

A solution I obtained by mixing 9.1 molar equivalents of stearyl methacrylate, 34.0 molar equivalents of benzyl methacrylate, 31.9 molar equivalents of hydroxyethyl methacrylate, 25.0 molar equivalents of methacrylic acid, and 0.8 molar equivalents of 2-mercaptopropionic acid and a solution II obtained by dissolving 1% by mass of t-butylperoxy-2-ethylhexanoate (Perbutyl O, manufactured by NOF Corporation) with respect to the total mass of the monomers in 20% by mass of dipropylene glycol with respect to the total mass of the monomers were respectively prepared. The solution I was added dropwise to the three-neck flask for 4 hours, and the solution II was added dropwise thereto for 5 hours.

After the completion of the dropwise addition, the resulting solution was allowed to further react for 2 hours, heated to 95° C., and heated and stirred for 3 hours so that all unreacted monomers were allowed to react. The disappearance of monomers was confirmed by the nuclear magnetic resonance ($^1$H-NMR) method.

The obtained reaction solution was heated to 70° C., 20.0 molar equivalents of dimethylethanolamine was added thereto as an amine compound, propylene glycol was added thereto, and the resulting solution was stirred, thereby obtaining a 30 mass % solution of the pigment dispersion resin P-1.

The constituent components of the obtained polymer were confirmed by $^1$H-NMR. Further, the weight-average molecular weight (Mw) determined by GPC was 22000.

Further, the mass ratio of respective constitutional units in the pigment dispersion resin P-1 (constitutional unit derived from stearyl methacrylate/constitutional unit derived from benzyl methacrylate/constitutional unit derived from hydroxyethyl methacrylate/constitutional unit derived from methacrylic acid) was 20/39/27/14.

Here, the mass ratio is a value that does not include the mass of dimethylaminoethanol.

Further, the numerical value on the lower right side of the parentheses of each of the following constitutional units is the molar ratio.

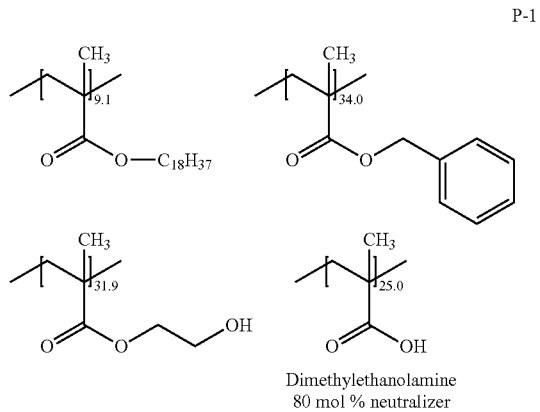

P-1

Dimethylethanolamine
80 mol % neutralizer (Preparation of Titanium Dioxide (TiO$_2$) Aqueous Dispersion Liquid)

A TiO$_2$ dispersion liquid was prepared in the following manner using a Lady Mill model LSG-4U-08 (manufactured by AIMEX Co., Ltd.).

That is, 45 parts by mass of titanium dioxide (TiO$_2$; average primary particle diameter: 210 nm, trade name: PF-690, manufactured by Ishihara Sangyo Kaisha, Ltd.; white inorganic pigment), 15 parts by mass of a 30 mass % solution of the pigment dispersion resin P-1, and 40 parts by mass of ultrapure water were added to a zirconia container. Further, 40 parts by mass of 0.5 mmφ zirconia beads (Torayceram beads, manufactured by Toray Industries, Inc.) were added thereto and mixed gently using a spatula. The zirconia container having the obtained mixture was put into a ball mill and dispersed at a rotation speed of 1000 rpm (revolutions per minute) for 5 hours. After the dispersion was completed, the beads were removed by filtration with a filter cloth, thereby preparing a TiO$_2$ dispersion liquid having a TiO$_2$ concentration of 45% by mass.

Example 1

<Preparation of Ink>

An ink with the following composition was prepared using the aqueous dispersion liquid of the acryl 1, the titanium dioxide (TiO$_2$) aqueous dispersion liquid, diethylene glycol monobutyl ether (DEGmBE) as an organic solvent (C), propylene glycol (PG) as a water-soluble organic solvent (D), and water.

The prepared ink is a white ink containing titanium dioxide (TiO$_2$) which is a white inorganic pigment as a colorant.

—Composition of Ink—

Acryl 1 [resin particles formed of main resin in resin (B)] . . . 5.0% by mass;
DEGmBE [organic solvent (C)] . . . 1.0% by mass;
PG [water-soluble organic solvent (D)] . . . 27% by mass;
Titanium dioxide (TiO$_2$) [colorant] . . . 7.0% by mass;
Pigment dispersion resin P-1 [resin other than main resin in resin (B)] . . . 0.5% by mass;
Water: remaining amount set such that total amount was 100% by mass.

<Image Recording>

Image recording was performed in the following manner using the ink described above and a biaxially oriented polypropylene (OPP) film (thickness of 40 surface treatment: corona discharge treatment, manufactured by Futamura Chemical Co., Ltd., abbreviation: OPP) as an impermeable base material.

(1) Recording Method

A white image was recorded by applying the ink onto the surface of the impermeable base material, on which a corona discharge treatment had been performed, in the form of a solid image using an ink jet recording device equipped with a transport system for transporting a base material and an ink jet head and drying the applied ink at 80° C. for 30 seconds. The ink was dried by placing the impermeable base material, to which the ink had been applied, on a hot plate.

(2) Recording Conditions

Ink jet head: 1200 dpi/20 inch-width piezo full line head
Ink jet amount: 4.0 pL
Driving frequency: 30 kHz (transport speed of base material: 635 mm/sec)

<Evaluation>

The following evaluations were performed on the inks or images.

The results are listed in Table 1.

(Adhesiveness of Image)

The adhesiveness of the image was evaluated by attaching a piece of Cellotape (registered trademark, No. 405, manufactured by Nichiban Co., Ltd., width of 12 mm, hereinafter, also simply referred to as "tape") to the solid image after 5 minutes from the recording of the solid image (that is, drying of the image at 80° C. for 30 seconds) and peeling the piece of tape from the solid image.

Specifically, the attachment and peeling of the tape were performed according to the following method.

The tape was taken out at a constant speed and cut into a piece with a length of approximately 75 mm to obtain a piece of tape.

The obtained piece of tape was superimposed on the solid image, and a region with a width of 12 mm and a length of 25 mm at the center of the piece of tape was attached and firmly rubbed with the fingertip.

The end of the piece of tape was grabbed in 5 minutes after attachment of the piece of tape and peeled at an angle as close to 60° as possible in 0.5 seconds to 1.0 seconds.

The presence or absence of adhesive matter on the piece of peeled tape and the presence or absence of peeling of the solid image on the impermeable base material were visually observed, and the adhesiveness of the image was evaluated based on the following evaluation standards.

In the following evaluation standards, the rank of the most excellent adhesiveness of the image is "A".

—Evaluation Standards for Adhesiveness of Image—

A: Adhesive matter was not visually recognized from the piece of tape, and peeling of the image on the impermeable base material was not visually recognized.

B: A small amount of colored adhesive matter was visually recognized from the piece of tape, but peeling of the image on the impermeable base material was not visually recognized.

C: A small amount of colored adhesive matter was visually recognized from the piece of tape and slight peeling was visually recognized from the image on the impermeable base material, which was within a practically acceptable range.

D: Colored adhesive matter was visually recognized from the piece of tape and peeling was also visually recognized from the image on the impermeable base material, which was out of a practically acceptable range.

E: Colored adhesive matter was visually recognized from the piece of tape, most of the image on the impermeable base material was peeled off, and the impermeable base material was visually recognized.

(Rub Resistance of Image)

The solid image after 5 minutes from the recording of the solid image (that is, drying of the image at 80° C. for 30 seconds) was repeatedly rubbed with a paperweight wound with rubbing paper. As the rubbing paper, OK Top Coat 104 (manufactured by Oji Paper Co., Ltd.) was used. Further, the rubbing operation described above was performed in a state where a load of 4.0 N was applied.

The color transfer from the solid image to the rubbing paper was visually observed, and the rub resistance of the image was evaluated based on the following evaluation standards.

In the following evaluation standards, the rank of the most excellent rub resistance of the image is "A".

—Evaluation Standards for Rub Resistance of Image—

A: Color transfer from the solid image to the rubbing paper was not visually recognized at the time of completion of the rubbing operation performed 200 times.

B: Color transfer from the solid image to the rubbing paper was visually recognized at the time of completion of the rubbing operation performed 200 times, but color transfer from the solid image to the rubbing paper was not visually recognized at the time of completion of the rubbing operation performed 100 times.

C: Color transfer from the solid image to the rubbing paper was visually recognized at the time of completion of the rubbing operation performed 100 times, but color transfer from the solid image to the rubbing paper was not visually recognized at the time of completion of the rubbing operation performed 20 times.

D: Color transfer from the solid image to the rubbing paper was visually recognized at the time of completion of the rubbing operation performed 20 times, but color transfer from the solid image to the rubbing paper was not visually recognized at the time of completion of the rubbing operation performed 5 times.

E: Color transfer from the solid image to the rubbing paper was not visually recognized at the time of completion of the rubbing operation performed 5 times.

(Drying Property of Image)

The logarithmic decrement (%) of the solid image after 5 minutes from the recording of the solid image (that is, drying of the image at 80° C. for 30 seconds) was measured at the time at which the temperature of the solid image (hereinafter, also referred to as the "sample temperature") was increased to 150° C. from room temperature at a temperature increase rate of 6.0° C./min using a pendulum viscoelasticity tester (rigid pendulum type physical property tester "RPT-3000W", manufactured by A&D Co., Ltd.). Based on the obtained results, the drying property of the image was evaluated based on the following evaluation standards.

In the evaluation standards, the rank of the most excellent drying property of the image is "A".

—Evaluation Standards for Drying Property of Image—

A: The logarithmic decrement at a sample temperature of 80° C. was less than 4%.

B: The logarithmic decrement at a sample temperature of 80° C. was 4% or greater and less than 6%.

C: The logarithmic decrement at a sample temperature of 80° C. was 6% or greater and less than 10%.

D: The logarithmic decrement at a sample temperature of 80° C. was 10% or greater and less than 15%.

E: The logarithmic decrement at a sample temperature of 80° C. was 15% or greater.

(Jettability of Ink)

After completion of the image recording, the ink jet recording device was allowed to stand (in an environment of 25° C. and a relative humidity of 50%) for 10 minutes without performing image recording.

After completion of the standing, the same image recording as described above was performed again. The jettability of the ink was evaluated by calculating the ratio of the number of nozzles (jet failure nozzles) from which the ink was not jetted to the total number of nozzles in the ink jet head (jet failure nozzle rate, %) based on the following evaluation standards.

In the following evaluation standards, the rank of the most excellent jettability of the ink is "A".

—Evaluation Standards for Jettability of Ink—

A: The jet failure nozzle rate was less than 20%.

B: The jet failure nozzle rate was 20% or greater and less than 40%.

C: The jet failure nozzle rate was 40% or greater and less than 60%.

D: The jet failure nozzle rate was 60% or greater and less than 80%.

E: The jet failure nozzle rate was 80% or greater.

Examples 2 to 6, 15 to 20, and 22 to 26

The same operation as in Example 1 was performed except that the combination of the kind of the main resin in the resin (B) and the kind and content of the organic solvent (C) was changed as listed in Table 1.

The results are listed in Table 1.

Here, Example 24 is an example using two kinds of organic solvents (C).

Examples 7 to 14

The same operation as in Example 1 was performed except that the combination of the content of the organic solvent (C) and the content of the water-soluble organic solvent (D) was changed as listed in Table 1.

The results are listed in Table 1.

Example 21

The same operation as in Example 1 was performed except that the water-soluble organic solvent (D) was not contained.

The results are listed in Table 1.

Comparative Examples 1, 2, and 5 to 7

The same operation as in Example 1 was performed except that the combination of the kind of the main resin in the resin (B) and the kind and content of the organic solvent (C) was changed as listed in Table 1.

The results are listed in Table 1.

Further, 1,2-BDO (1,2-butanediol), glycerin, benzyl benzoate, and NMP (N-methyl-2-pyrrolidone) are comparative solvents that do not correspond to the organic solvent (C), and an olefin-maleic acid anhydride copolymer 1 is a comparative resin that does not correspond to the resin (B).

Comparative Examples 3 and 4

The same operation as in Example 1 was performed except that the content of the organic solvent (C) was changed as listed in Table 1.

The results are listed in Table 1.

TABLE 1

| | Main resin in resin (B) or comparative resin | | Organic solvent (C) or comparative solvent | | | | | Water-soluble organic solvent (D) |
|---|---|---|---|---|---|---|---|---|
| | Type | SP value ($SP_B$) | Type | SP value ($SP_C$) | Boiling point (° C.) | Content | $|SP_C - SP_B|$ | Type |
| Example 1 | Acryl 1 | 19.7 | DEGmBE | 21.5 | 230 | 1.0% | 1.8 | PG |
| Example 2 | Acryl 1 | 19.7 | DPGmME | 22.1 | 188 | 1.0% | 2.4 | PG |
| Example 3 | Acryl 1 | 19.7 | DEGmEE | 22.8 | 202 | 1.0% | 3.1 | PG |
| Example 4 | Acryl 1 | 19.7 | PGmME | 23.6 | 120 | 1.0% | 3.9 | PG |
| Example 5 | Acryl 2 | 21.9 | 1,2-HDO | 27.1 | 223 | 1.0% | 5.2 | PG |
| Example 6 | Acryl 2 | 21.9 | 2-Ethyl-1,3-HDO | 25.9 | 244 | 1.0% | 4.0 | PG |
| Example 7 | Acryl 1 | 19.7 | DEGmBE | 21.5 | 230 | 3.0% | 1.8 | PG |
| Example 8 | Acryl 1 | 19.7 | DEGmBE | 21.5 | 230 | 5.0% | 1.8 | PG |
| Example 9 | Acryl 1 | 19.7 | DEGmBE | 21.5 | 230 | 0.1% | 1.8 | PG |
| Example 10 | Acryl 1 | 19.7 | DEGmBE | 21.5 | 230 | 0.05% | 1.8 | PG |
| Example 11 | Acryl 1 | 19.7 | DEGmBE | 21.5 | 230 | 0.05% | 1.8 | PG |
| Example 12 | Acryl 1 | 19.7 | DEGmBE | 21.5 | 230 | 1.0% | 1.8 | PG |
| Example 13 | Acryl 1 | 19.7 | DEGmBE | 21.5 | 230 | 1.0% | 1.8 | PG |
| Example 14 | Acryl 1 | 19.7 | DEGmBE | 21.5 | 230 | 1.0% | 1.8 | PG |
| Example 15 | Acryl 1 | 19.7 | DPG | 28.1 | 232 | 1.0% | 8.4 | PG |
| Example 16 | Acryl 1 | 19.7 | 1,2-HDO | 27.1 | 223 | 1.0% | 7.4 | PG |
| Example 17 | Acryl 1 | 19.7 | 2-Ethyl-1-hexanol | 19.7 | 187 | 1.0% | 0 | PG |
| Example 18 | Acryl 1 | 19.7 | TPGmME | 20.4 | 243 | 1.0% | 0.7 | PG |
| Example 19 | Acryl 3 | 18.6 | DEGmBE | 21.5 | 230 | 1.0% | 2.9 | PG |
| Example 20 | Urethane 1 | 19.1 | DEGmBE | 21.5 | 230 | 1.0% | 2.4 | PG |
| Example 21 | Acryl 1 | 19.7 | DEGmBE | 21.5 | 230 | 1.0% | 1.8 | N/A |
| Example 22 | Acryl 1 | 19.7 | PGmBE | 21.1 | 170 | 1.0% | 1.4 | PG |
| Example 23 | Acryl 1 | 19.7 | PGmPE | 21.7 | 149 | 1.0% | 2.0 | PG |
| Example 24 | Acryl 1 | 19.7 | DPGmME | 22.1 | 188 | 0.5% | 2.4 | PG |
| | | | PGmPE | 21.7 | 149 | 1.5% | 2.0 | |
| Example 25 | Polyester 1 | 18.3 | TPGmME | 20.4 | 243 | 1.0% | 2.1 | PG |
| Example 26 | Acryl 1 | 19.7 | DEGmBE | 21.5 | 230 | 1.0% | 1.8 | DEG |
| Comparative Example 1 | Acryl 3 | 18.6 | 1,2-BDO | 31.4 | 194 | 1.0% | 12.8 | PG |
| Comparative Example 2 | Acryl 1 | 19.7 | Glycerin | 48.8 | 290 | 1.0% | 29.1 | PG |
| Comparative Example 3 | Acryl 1 | 19.7 | DEGmBE | 21.5 | 230 | 0.005% | 1.8 | PG |
| Comparative Example 4 | Acryl 1 | 19.7 | DEGmBE | 21.5 | 230 | 7.0% | 1.8 | PG |
| Comparative Example 5 | Acryl 1 | 19.7 | Benzyl benzoate | 23.3 | 323 | 1.0% | 3.6 | PG |
| Comparative Example 6 | Olefin-maleic acid anhydride copolymer 1 | 25.6 | DEGmBE | 21.5 | 230 | 1.0% | 4.1 | PG |
| Comparative Example 7 | Acryl 1 | 19.7 | NMP | 23.6 | 245 | 3.0% | 3.9 | PG |

| | Water-soluble organic solvent (D) | | | | Evaluation results | | | |
|---|---|---|---|---|---|---|---|---|
| | SP value ($SP_C$) | Boiling point (° C.) | Content | $|SP_D - SP_B|$ | Adhesiveness | Rub resistance | Drying property | Jettability |
| Example 1 | 35.1 | 188 | 27% | 15.4 | A | A | A | A |
| Example 2 | 35.1 | 188 | 27% | 15.4 | A | A | A | A |
| Example 3 | 35.1 | 188 | 27% | 15.4 | B | B | A | A |
| Example 4 | 35.1 | 188 | 27% | 15.4 | B | B | A | A |
| Example 5 | 35.1 | 188 | 27% | 13.2 | C | C | A | A |
| Example 6 | 35.1 | 188 | 27% | 13.2 | B | B | A | A |
| Example 7 | 35.1 | 188 | 27% | 15.4 | A | A | A | A |
| Example 8 | 35.1 | 188 | 27% | 15.4 | A | A | B | A |
| Example 9 | 35.1 | 188 | 27% | 15.4 | B | B | A | A |
| Example 10 | 35.1 | 188 | 27% | 15.4 | B | B | A | A |
| Example 11 | 35.1 | 188 | 35% | 15.4 | B | B | A | A |

TABLE 1-continued

|  |  |  |  |  |  |  |  |  |
|---|---|---|---|---|---|---|---|---|
| Example 12 | 35.1 | 188 | 15% | 15.4 | A | A | A | B |
| Example 13 | 35.1 | 188 | 35% | 15.4 | A | A | A | A |
| Example 14 | 35.1 | 188 | 45% | 15.4 | A | A | B | A |
| Example 15 | 35.1 | 188 | 27% | 15.4 | C | C | A | A |
| Example 16 | 35.1 | 188 | 27% | 15.4 | C | C | A | A |
| Example 17 | 35.1 | 188 | 27% | 15.4 | A | A | A | A |
| Example 18 | 35.1 | 188 | 27% | 15.4 | A | A | A | B |
| Example 19 | 35.1 | 188 | 27% | 16.5 | A | A | A | A |
| Example 20 | 35.1 | 188 | 27% | 16.0 | A | A | A | A |
| Example 21 | — | — | — | — | A | A | A | C |
| Example 22 | 35.1 | 188 | 27% | 15.4 | A | A | A | A |
| Example 23 | 35.1 | 188 | 27% | 15.4 | A | A | A | A |
| Example 24 | 35.1 | 188 | 27% | 15.4 | A | A | A | A |
| Example 25 | 35.1 | 188 | 27% | 16.8 | A | A | A | A |
| Example 26 | 32.3 | 245 | 27% | 12.6 | A | A | A | A |
| Comparative Example 1 | 35.1 | 188 | 27% | 16.5 | E | E | A | A |
| Comparative Example 2 | 35.1 | 188 | 27% | 15.4 | E | E | E | A |
| Comparative Example 3 | 35.1 | 188 | 27% | 15.4 | E | E | A | A |
| Comparative Example 4 | 35.1 | 188 | 27% | 15.4 | C | C | D | A |
| Comparative Example 5 | 35.1 | 188 | 27% | 15.4 | B | B | E | A |
| Comparative Example 6 | 35.1 | 188 | 27% | 9.5 | B | B | D | D |
| Comparative Example 7 | 35.1 | 188 | 27% | 15.4 | B | B | D | A |

- Explanation of Table 1 -
"%" showing the content indicates "% by mass".
The unit of the SP value is MPA$^{1/2}$.
The notation of water and the colorant in the ink is omitted.
- Abbreviation of water-soluble organic solvents in Table 1 -
DEGmBE: diethylene glycol monobutyl ether
DPGmME: dipropylene glycol monomethyl ether
DEGmEE: diethylene glycol monoethyl ether
PGmME: propylene glycol monomethyl ether
PGmBE: propylene glycol monobutyl ether
PGmPE: propylene glycol monopropyl ether
1,2-HDO: 1,2-hexanediol
2-Ethyl-1,3-HDO: 2-ethyl-1,3-hexanediol
DPG: dipropylene glycol
TPGmME: tripropylene glycol monomethyl ether
PG: propylene glycol
DEG: diethylene glycol
1,2-BDO (comparative solvent): 1,2-butanediol
NMP (comparative solvent): N-methyl-2-pyrrolidone As listed in Table 1, in each of Examples 1 to 26 in which the ink containing the resin (B) which is at least one selected from the group consisting of an acrylic resin, a polyester resin, and a urethane resin and the organic solvent (C) which has a boiling point of 250° C. or lower, contains no nitrogen atom, and satisfies an expression of "|SP$_C$–SP$_B$|≤10.0" (that is, satisfying Expression (C1)), in which the total content of the organic solvent (C) is in a range of 0.01% by mass to 5.0% by mass with respect to the total amount of the ink was used, an image with the excellent adhesiveness, rub resistance, and drying property was able to be recorded.

In Comparative Examples 1 and 2 in which comparative solvents (specifically, 1,2-BDO and glycerin) having |SP$_C$–SP$_B$| of greater than 10.0 were used in place of the organic solvent (C), the adhesiveness of the image and the rub resistance of the image were degraded. Here, in Comparative Example 2 in which a comparative solvent (specifically, glycerin) having |SP$_C$–SP$_B$| of greatly exceeding 10.0 was used, the drying property of the image was further degraded.

In Comparative Example 3 in which the total content of the organic solvent (C) was less than 0.01% by mass, the adhesiveness of the image and the rub resistance of the image were degraded.

In Comparative Example 4 in which the total content of the organic solvent (C) was greater than 5.0% by mass, the drying property of the image was degraded.

In Comparative Example 5 in which a comparative solvent (specifically, benzyl benzoate) having a boiling point of higher than 250° C. was used in place of the organic solvent (C), the drying property of the image was degraded.

In Comparative Example 6 in which a comparative resin (specifically, the olefin-maleic acid anhydride copolymer 1) was used in place of the main resin in the resin (B), the drying property of the image was degraded. Further, in Comparative Example 6, the jettability of the ink was also degraded.

In Comparative Example 7 in which a comparative solvent (specifically, NMP) having a nitrogen atom was used in place of the organic solvent (C), the drying property of the image was degraded.

Based on the comparison between Examples 1 to 4 and 17 and Examples 15 and 16, it was found that in a case where the organic solvent (C) contained at least one selected from the group consisting of a glycol monoether compound and a monoalcohol compound having 5 or more carbon atoms (Examples 1 to 4 and 17), the adhesiveness of the image and the rub resistance of the image were further improved.

Based on the comparison between Examples 1 to 4, 6 and Example 5, it was found that in a case where $|SP_C-SP_B|$ was 5.0 or less (Examples 1 to 4 and 6), the adhesiveness of the image and the rub resistance of the image were further improved.

Based on the comparison between Example 1 and Example 21, it was found that in a case where the ink contained the water-soluble organic solvent (D) having a boiling point of 250° C. or lower and satisfying an expression of "$|SP_D-SP_B|>10.0$" (that is, satisfying Expression (D1)) (Example 1), the jettability of the ink was further improved.

Based on the comparison between Examples 1 and 13 and Example 12, it was found that in a case where the total content of the water-soluble organic solvent (D) was 20% by mass or greater with respect to the total amount of the ink (Examples 1 and 13), the jettability of the ink was further improved.

Based on the comparison between Examples 1 and 13 and Example 14, it was found that in a case where the total content of the water-soluble organic solvent (D) was 40% by mass or less with respect to the total amount of the ink (Examples 1 and 13), the drying property of the image was further improved.

Example 27

<Preparation and Evaluation of Ink>

An ink with the following composition was prepared using the aqueous dispersion liquid of the acryl 1, a cyan pigment aqueous dispersion liquid, diethylene glycol monobutyl ether (DEGmBE) as the organic solvent (C), propylene glycol (PG) as the water-soluble organic solvent (D), and water.

Here, Pro-Jet Cyan APD3000 (manufactured by FUJIFILM Imaging Colorants Limited) was used as the cyan pigment aqueous dispersion liquid.

The prepared ink is a blue ink containing Pigment Blue 15:3, which is a cyan organic pigment, as a colorant.

The same evaluations as the evaluations in Example 1 were performed using this ink. As the evaluation results, all items (that is, the adhesiveness of the image, the rub resistance of the image, the drying property of the image, and the jettability of the ink) were "A".

—Composition of Ink—
  Acryl 1 [resin particles formed of main resin in resin (B)] . . . 5.0% by mass;
  DEGmBE [organic solvent (C)] . . . 1.0% by mass;
  PG [water-soluble organic solvent (D)] . . . 27% by mass;
  Pigment Blue 15:3 [colorant] . . . 3.0% by mass;
  Pigment dispersion resin [resin other than main resin in resin (B)] . . . 1.4% by mass;
  Water: remaining amount set such that total amount was 100% by mass.

Example 28

<Preparation and Evaluation of Ink>

An ink with the following composition was prepared using the aqueous dispersion liquid of the acryl 1, a magenta pigment aqueous dispersion liquid, diethylene glycol monobutyl ether (DEGmBE) as the organic solvent (C), propylene glycol (PG) as the water-soluble organic solvent (D), and water.

Here, Pro-Jet Magenta APD3000 (manufactured by FUJIFILM Imaging Colorants Limited) was used as the magenta pigment aqueous dispersion liquid.

The prepared ink is a magenta ink containing Pigment Red 122, which is a magenta organic pigment, as a colorant.

The same evaluations as the evaluations in Example 1 were performed using this ink. As the evaluation results, all items (that is, the adhesiveness of the image, the rub resistance of the image, the drying property of the image, and the jettability of the ink) were "A".

—Composition of Ink—
  Acryl 1 [resin particles formed of main resin in resin (B)] . . . 5.0% by mass;
  DEGmBE [organic solvent (C)] . . . 1.0% by mass;
  PG [water-soluble organic solvent (D)] . . . 27% by mass;
  Pigment Red 122 [colorant] . . . 5.0% by mass;
  Pigment dispersion resin [resin other than main resin in resin (B)] . . . 1.5% by mass;
  Water: remaining amount set such that total amount was 100% by mass.

Example 29

<Preparation and Evaluation of Ink>

An ink with the following composition was prepared using the aqueous dispersion liquid of the acryl 1, a yellow pigment aqueous dispersion liquid, diethylene glycol monobutyl ether (DEGmBE) as the organic solvent (C), propylene glycol (PG) as the water-soluble organic solvent (D), and water.

Here, Pro-Jet Yellow APD3000 (manufactured by FUJIFILM Imaging Colorants Limited) was used as the yellow pigment aqueous dispersion liquid.

The prepared ink is a yellow ink containing Pigment Yellow 74, which is a yellow organic pigment, as a colorant.

The same evaluations as the evaluations in Example 1 were performed using this ink. As the evaluation results, all items (that is, the adhesiveness of the image, the rub resistance of the image, the drying property of the image, and the jettability of the ink) were "A".

—Composition of Ink—
  Acryl 1 [resin particles formed of main resin in resin (B)] . . . 5.0% by mass;
  DEGmBE [organic solvent (C)] . . . 1.0% by mass;
  PG [water-soluble organic solvent (D)] . . . 27% by mass;
  Pigment Yellow 74 [colorant] . . . 4.0% by mass;
  Pigment dispersion resin [resin other than main resin in resin (B)] . . . 1.6% by mass;
  Water: remaining amount set such that total amount was 100% by mass.

Example 30

<Preparation and Evaluation of Ink>

An ink with the following composition was prepared using the aqueous dispersion liquid of the acryl 1, a black pigment aqueous dispersion liquid, diethylene glycol monobutyl ether (DEGmBE) as the organic solvent (C), propylene glycol (PG) as the water-soluble organic solvent (D), and water.

Here, Pro-Jet Black APD3000 (manufactured by FUJIFILM Imaging Colorants Limited) was used as the black pigment aqueous dispersion liquid.

The prepared ink is a black ink containing carbon black, which is a black inorganic pigment, as a colorant.

The same evaluations as the evaluations in Example 1 were performed using this ink. As the evaluation results, all items (that is, the adhesiveness of the image, the rub resistance of the image, the drying property of the image, and the jettability of the ink) were "A".

—Composition of Ink—
Acryl 1 [resin particles formed of main resin in resin (B)] . . . 5.0% by mass;
DEGmBE [organic solvent (C)] . . . 1.0% by mass;
PG [water-soluble organic solvent (D)] . . . 27% by mass;
Carbon black [colorant] . . . 4.5% by mass;
Pigment dispersion resin [resin other than main resin in resin (B)] . . . 2.0% by mass;
Water: remaining amount set such that total amount was 100% by mass.

What is claimed is:

1. An ink composition for performing printing on an impermeable base material, comprising:
   water (A);
   a resin (B) which is at least one selected from the group consisting of an acrylic resin, a polyester resin, and a urethane resin; and
   an organic solvent (C) which has a boiling point of 250° C. or lower, has no nitrogen atom, and satisfies Expression (C1),
   wherein a total content of the organic solvent (C) is in a range of 0.01% by mass to 5.0% by mass with respect to a total amount of the ink composition for performing printing on an impermeable base material, $$|SP_C - SP_B| \leq 10.0 \qquad \text{Expression (C1)}$$

in Expression (C1), $SP_B$ represents an SP value of a main resin in the resin (B) in an $MPa^{1/2}$ unit, $SP_C$ represents an SP value of the organic solvent (C) in the $MPa^{1/2}$ unit, and $|SP_C - SP_B|$ represents an absolute value of a difference between $SP_C$ and $SP_B$,
   $SP_B$ is in a range of 15.0 to 30.0, and
   $SP_C$ is in a range of 17.5 to 30.0.

2. The ink composition for performing printing on an impermeable base material according to claim 1,
   wherein the organic solvent (C) contains at least one selected from the group consisting of a glycol compound, a glycol monoether compound, and a monoalcohol compound having 5 or more carbon atoms.

3. The ink composition for performing printing on an impermeable base material according to claim 1,
   wherein the organic solvent (C) contains at least one selected from the group consisting of a glycol monoether compound and a monoalcohol compound having 5 or more carbon atoms.

4. The ink composition for performing printing on an impermeable base material according to claim 1,
   wherein the organic solvent (C) contains at least one selected from the group consisting of diethylene glycol monobutyl ether, diethylene glycol monoethyl ether, dipropylene glycol monomethyl ether, ethylene glycol monobutyl ether, propylene glycol monobutyl ether, ethylene glycol monopropyl ether, propylene glycol monopropyl ether, propylene glycol monoethyl ether, propylene glycol monomethyl ether, tripropylene glycol monomethyl ether, and 2-ethyl-1-hexanol.

5. The ink composition for performing printing on an impermeable base material according to claim 1,
   wherein $|SP_C - SP_B|$ is 5.0 or less.

6. The ink composition for performing printing on an impermeable base material according to claim 5,
   wherein $|SP_C - SP_B|$ is 3.0 or less.

7. The ink composition for performing printing on an impermeable base material according to claim 1, further comprising:
   a water-soluble organic solvent (D) which has a boiling point of 250° C. or lower and satisfies Expression (D1), $$|SP_D - SP_B| > 10.0 \qquad \text{Expression (D1)}$$

in Expression (D1), $SP_B$ represents an SP value of a main resin in the resin (B) in an $MPa^{1/2}$ unit, $SP_D$ represents an SP value of the water-soluble organic solvent (D) in the $MPa^{1/2}$ unit, and $|SP_D - SP_B|$ represents an absolute value of a difference between $SP_D$ and $SP_B$.

8. The ink composition for performing printing on an impermeable base material according to claim 7,
   wherein a total content of the water-soluble organic solvent (D) is in a range of 20% by mass to 40% by mass with respect to the total amount of the ink composition for performing printing on an impermeable base material.

9. The ink composition for performing printing on an impermeable base material according to claim 7,
   wherein the water-soluble organic solvent (D) contains a glycol compound.

10. The ink composition for performing printing on an impermeable base material according to claim 1,
    wherein the resin (B) contains resin particles.

11. The ink composition for performing printing on an impermeable base material according to claim 1, further comprising:
    a colorant.

12. The ink composition for performing printing on an impermeable base material according to claim 1,
    wherein the resin (B) contains an alicyclic structure.

13. The ink composition for performing printing on an impermeable base material according to claim 11,
    wherein the colorant contains a white inorganic pigment, and
    the resin (B) contains an alicyclic structure.

14. The ink composition for performing printing on an impermeable base material according to claim 1,
    wherein the ink composition is used as an inkjet ink.

15. An image recording method comprising:
    applying an ink composition onto an impermeable base material to record an image,
    wherein the ink composition contains
    water (A);
    a resin (B) which is at least one selected from the group consisting of an acrylic resin, a polyester resin, and a urethane resin; and
    an organic solvent (C) which has a boiling point of 250° C. or lower, has no nitrogen atom, and satisfies Expression (C1), and
    a total content of the organic solvent (C) is in a range of 0.01% by mass to 5.0% by mass with respect to a total amount of the ink composition, $$|SP_C - SP_B| \leq 10.0 \qquad \text{Expression (C1)}$$

in Expression (C1), $SP_B$ represents an SP value of a main resin in the resin (B) in an $MPa^{1/2}$ unit, $SP_C$ represents an SP value of the organic solvent (C) in the $MPa^{1/2}$ unit, and $|SP_C - SP_B|$ represents an absolute value of a difference between $SP_C$ and $SP_B$,
    $SP_B$ is in a range of 15.0 to 30.0, and
    $SP_C$ is in a range of 17.5 to 30.0.

16. The image recording method according to claim 15,
    wherein $|SP_C - SP_B|$ is 5.0 or less.

17. The image recording method according to claim 16,
    wherein $|SP_C - SP_B|$ is 3.0 or less.

18. The image recording method according to claim 15,
    wherein the resin (B) contains an alicyclic structure.

19. An ink composition for performing printing on an impermeable base material, comprising:
- water (A);
- a resin (B) which is at least one selected from the group consisting of an acrylic resin, a polyester resin, and a urethane resin;
- an organic solvent (C) which has a boiling point of 250° C. or lower, has no nitrogen atom, and satisfies Expression (C1); and
- a water-soluble organic solvent (D) which has a boiling point of 250° C. or lower,
- wherein a total content of the organic solvent (C) is in a range of 0.01% by mass to 5.0% by mass with respect to a total amount of the ink composition for performing printing on an impermeable base material,
- the water-soluble organic solvent (D) contains a glycol compound,
- a total content of the water-soluble organic solvent (D) is in a range of 27% by mass to 40% by mass with respect to the total amount of the ink composition for performing printing on an impermeable base material, $$|SP_C - SP_B| \leq 10.0 \qquad \text{Expression (C1)}$$

in Expression (C1), $SP_B$ represents an SP value of a main resin in the resin (B) in an $MPa^{1/2}$ unit, $SP_C$ represents an SP value of the organic solvent (C) in the $MPa^{1/2}$ unit, and $|SP_C - SP_B|$ represents an absolute value of a difference between $SP_C$ and $SP_B$, and $SP_C$ is in a range of 17.5 to 30.0.

* * * * *